(12) United States Patent
Ning

(10) Patent No.: US 12,133,308 B2
(45) Date of Patent: Oct. 29, 2024

US012133308B2

(54) LIGHT SOURCE CIRCUIT AND TERMINAL

(71) Applicant: Honor Device Co., Ltd., Shenzhen (CN)

(72) Inventor: Xiaoqiang Ning, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/043,396

(22) PCT Filed: Apr. 27, 2022

(86) PCT No.: PCT/CN2022/089476
§ 371 (c)(1),
(2) Date: Feb. 28, 2023

(87) PCT Pub. No.: WO2022/252887
PCT Pub. Date: Dec. 8, 2022

(65) Prior Publication Data
US 2023/0328863 A1 Oct. 12, 2023

(30) Foreign Application Priority Data
Jun. 3, 2021 (CN) .......................... 202110620525.5

(51) Int. Cl.
*H05B 47/115* (2020.01)
*G01S 17/04* (2020.01)
*G06V 40/16* (2022.01)
*H05B 45/10* (2020.01)
*H05B 45/305* (2020.01)

(52) U.S. Cl.
CPC ............ *H05B 47/115* (2020.01); *G01S 17/04* (2020.01); *G06V 40/166* (2022.01); *H05B 45/10* (2020.01); *H05B 45/305* (2020.01)

(58) Field of Classification Search
None
See application file for complete search history.

(56) References Cited

U.S. PATENT DOCUMENTS 9,907,151 B2 2/2018 Ichikawa
10,575,384 B2 2/2020 Dielacher et al.
2007/0227231 A1* 10/2007 Koo .................. H01J 37/32422
73/31.05

(Continued)

FOREIGN PATENT DOCUMENTS

CN 101707826 A 5/2010
CN 102842893 A 12/2012

(Continued)

*Primary Examiner* — Wilson Lee
(74) *Attorney, Agent, or Firm* — Slater Matsil, LLP

(57) ABSTRACT

This application discloses a light source circuit and a terminal, and pertains to the field of circuit technologies. The light source circuit includes a light source module, a TOF drive module, and an optical proximity drive module. A first end of the light source module is connected to a first voltage end. An output end of the TOF drive module is connected to a second end of the light source module, to drive the light source module to emit light. An output end of the optical proximity drive module is connected to the second end of the light source module, to drive the light source module to emit light. At most one of the TOF drive module and the optical proximity drive module drives the light source module to emit light.

20 Claims, 25 Drawing Sheets

(56) References Cited

U.S. PATENT DOCUMENTS

| | | | |
|---|---|---|---|
| 2012/0175518 A1* | 7/2012 | Godet | H01J 37/244 |
| | | | 250/492.21 |
| 2014/0312233 A1 | 10/2014 | Mark et al. | |
| 2014/0346955 A1 | 11/2014 | Zhang | |
| 2016/0025855 A1 | 1/2016 | Camarri et al. | |
| 2016/0341664 A1 | 11/2016 | Rothberg et al. | |
| 2017/0019577 A1 | 1/2017 | Tan et al. | |
| 2017/0264076 A1 | 9/2017 | Moyer et al. | |
| 2019/0227146 A1 | 7/2019 | Couillault et al. | |
| 2020/0049539 A1* | 2/2020 | De Luca | G01K 7/02 |
| 2023/0055708 A1* | 2/2023 | Lee | B60W 60/001 |
| 2023/0060476 A1* | 3/2023 | Sampsell | H10K 59/124 |
| 2023/0273044 A1* | 8/2023 | Kim | G01C 21/3885 |
| | | | 701/26 |

FOREIGN PATENT DOCUMENTS

| | | |
|---|---|---|
| CN | 203301814 U | 11/2013 |
| CN | 104981073 A | 10/2015 |
| CN | 108445506 A | 8/2018 |
| CN | 109964539 A | 7/2019 |
| CN | 110187731 A | 8/2019 |
| CN | 111598073 A | 8/2020 |
| CN | 113473675 A | 10/2021 |
| DE | 102015217712 A1 | 3/2016 |

\* cited by examiner

LIGHT SOURCE CIRCUIT AND TERMINAL

CROSS-REFERENCE TO RELATED APPLICATIONS

This application is a National Stage of International Application No. PCT/CN2022/089476, filed on Apr. 27, 2022, which claims priority to Chinese Patent Application No. 202110620525.5, filed on Jun. 3, 2021, both of which are hereby incorporated by reference in their entireties.

TECHNICAL FIELD

This application relates to the field of circuit technologies, and in particular, to a light source circuit and a terminal.

BACKGROUND

A terminal usually has an object recognition function and a proximity detection function. In a related technology, the object recognition function is implemented by a time of flight (time of flight, TOF) light source module, a TOF drive module, and a TOF receiving module. The proximity detection function is implemented by an optical proximity light source module, an optical proximity drive module, and an optical proximity receiving module.

When the terminal needs to recognize an object, the TOF drive module drives the TOF light source module to emit light to the object. The TOF receiving module receives reflected light formed when the emitted light is irradiated onto the object. Depth information of the object is obtained by detecting a time of flight (that is, a round trip time) of the light, to recognize the object.

When the terminal needs to perform proximity detection, the optical proximity drive module drives the optical proximity light source module to emit light. The optical proximity receiving module detects reflected light of the emitted light. When the optical proximity receiving module detects the reflected light, it indicates that an object approaches the terminal.

However, in the related technology, the terminal uses a relatively large quantity of components to implement the object recognition function and the proximity detection function. This is not conducive to improving integration of the terminal.

SUMMARY

This application provides a light source circuit and a terminal, to reduce components used for an object recognition function and a proximity detection function, so as to help improve integration of a terminal. The technical solutions are as follows.

According to a first aspect, a light source circuit is provided, including a light source module, a TOF drive module, and an optical proximity drive module. A first end of the light source module is connected to a first voltage end. An output end of the TOF drive module is connected to a second end of the light source module, to drive the light source module to emit light. An output end of the optical proximity drive module is connected to the second end of the light source module, to drive the light source module to emit light. At most one of the TOF drive module and the optical proximity drive module drives the light source module to emit light.

In this application, at most one of the TOF drive module and the optical proximity drive module drives the light source module to emit light. After the light source circuit is used in a terminal, if the terminal needs to recognize an object, the TOF drive module drives the light source module to work; or when the terminal needs to perform proximity detection, the optical proximity drive module drives the light source module to work. The light source module may serve as a TOF light source for implementing an object recognition function, and may serve as an optical proximity light source for implementing a proximity detection function, to reduce components used when the terminal implements the object recognition function and the proximity detection function, so as to help improve integration of the terminal.

Optionally, the light source circuit further includes a first switch module. The output end of the optical proximity drive module is connected to a control end of the first switch module, to control turn-on and turn-off of the first switch module. A first end of the first switch module is connected to the second end of the light source module, a second end of the first switch module is connected to a second voltage end, and a voltage of the second voltage end is less than a voltage of the first voltage end, so that the light source module emits light when the first switch module is turned on.

In this application, the first switch module is connected between the second end of the light source module and the second voltage end. The voltage of the second voltage end is less than the voltage of the first voltage end. When the first switch module is turned on, a path with a voltage difference is formed between the first voltage end and the second voltage end through the light source module and the first switch module, so that the light source module emits light. The output end of the optical proximity drive module is connected to the control end of the first switch module, and the optical proximity drive module may control the first switch module to be turned on to drive the light source module to emit light.

Optionally, the first switch module includes a transistor Q1. A first end of the transistor Q1 is connected to the second end of the light source module, a second end of the transistor Q1 is connected to the second voltage end, and a control end of the transistor Q1 is connected to the output end of the optical proximity drive module.

In this application, the transistor Q1 is connected between the second end of the light source module and the second voltage end. The voltage of the second voltage end is less than the voltage of the first voltage end. When the transistor Q1 is turned on, a path with a voltage difference is formed between the first voltage end and the second voltage end through the light source module and the transistor Q1, so that the light source module emits light. The output end of the optical proximity drive module is connected to the control end of the transistor Q1, and the optical proximity drive module may control the transistor Q1 to be turned on to drive the light source module to emit light.

Optionally, the first switch module includes a transistor Q2 and a transistor Q3. A first end of the transistor Q2 is connected to a third voltage end, a second end of the transistor Q2 is connected to a control end of the transistor Q3, and a control end of the transistor Q2 is connected to the output end of the optical proximity drive module. A first end of the transistor Q3 is connected to the second end of the light source module, and a second end of the transistor Q3 is connected to the second voltage end.

In this application, the output end of the optical proximity drive module is connected to the control end of the transistor Q2, so that the optical proximity drive module can drive the transistor Q2 to be turned on. When the transistor Q2 is turned on, the control end of the transistor Q3 is connected to the third voltage end, so that the transistor Q3 is turned on. In this case, a path with a voltage difference is formed between the first voltage end and the second voltage end through the light source module and the transistor Q3, and the light source module is powered on and emits light.

Optionally, the first switch module further includes a turn-off circuit and a current-limiting circuit. A first end of the turn-off circuit is connected to the first end of the transistor Q2, and a second end of the turn-off circuit is connected to the control end of the transistor Q2. A first end of the current-limiting circuit is connected to the second end of the transistor Q2, and a second end of the current-limiting circuit is connected to a ground cable GND.

In this application, the turn-off circuit may be a circuit including a resistor. The turn-off circuit is connected between the first end of the transistor Q2 and the control end of the transistor Q2. When the switch module needs to be turned off, the optical proximity drive module no longer drives the transistor Q2 to be turned on. In this case, the control end of the transistor Q2 is connected to the third voltage end through the turn-off circuit, and a voltage of the control end of the transistor Q2 is the same as a voltage of the first end of the transistor Q2, to ensure that the transistor Q2 is turned off. The current-limiting circuit may also be a circuit including a resistor. The current-limiting circuit is connected between the second end of the transistor Q2 and the ground cable GND, to prevent a current flowing through the transistor Q2 from being excessively high, so as to avoid an electric energy waste.

Optionally, the light source circuit further includes a first sampling control module. A first end of the first sampling control module is connected to the second end of the light source module, and a second end of the first sampling control module is connected to the first end of the first switch module. Alternatively, a first end of the first sampling control module is connected to the second end of the first switch module, and a second end of the first sampling control module is connected to the second voltage end. When the first switch module is turned on, the first sampling control module detects a current value of the light source module to obtain a first current value. A first output end of the first sampling control module is connected to the control end of the first switch module, and the first sampling control module controls the first switch module to be turned off when the first current value exceeds a first current threshold.

In this application, when the optical proximity drive module drives the first switch module to be turned on, a path with a voltage difference is formed between the first voltage end and the second voltage end through the light source module, the first switch module, and the first sampling control module. In this way, when the light source module works as an optical proximity light source, the first sampling control module may control the first switch module to be turned off when the current value of the light source module exceeds the first current threshold, to avoid that light emitted by the light source module is excessively strong and endangers human eye safety.

Optionally, the first sampling control module includes a resistor R1, a current detector, and a controller. The resistor R1 is connected between the second end of the light source module and the first end of the first switch module, or the resistor R1 is connected between the second end of the first switch module and the second voltage end. An input end of the current detector is connected to the resistor R1 to detect a current value of the resistor R1 to obtain the first current value. An output end of the current detector is connected to an input end of the controller, to output the first current value to the controller. An output end of the controller is connected to the control end of the first switch module, and the controller controls the first switch module to be turned off when the first current value exceeds the first current threshold.

In this application, when the optical proximity drive module drives the first switch module to be turned on, a path with a voltage difference is formed between the first voltage end and the second voltage end through the light source module, the first switch module, and the resistor R1. In this way, the current detector may obtain, by detecting the current value of the resistor R1, a current value existing when the light source module works as an optical proximity light source. When the first current value exceeds the first current threshold, the controller controls the first switch module to be turned off, to avoid that light emitted by the light source module is excessively strong and endangers human eye safety.

Optionally, the first sampling control module includes a resistor R2 and an operational amplifier A1. A first end of the resistor R2 is connected to the second end of the light source module, and a second end of the resistor R2 is connected to the first end of the first switch module. Alternatively, a first end of the resistor R2 is connected to the second end of the first switch module, and a second end of the resistor R2 is connected to the second voltage end. An in-phase input end of the operational amplifier A1 is connected to the first end of the resistor R2, an inverting input end of the operational amplifier A1 is connected to a fourth voltage end, an output end of the operational amplifier A1 is connected to the control end of the first switch module, and a voltage of the fourth voltage end is a product of resistance of the resistor R2 and the first current threshold.

In this application, when the optical proximity drive module drives the first switch module to be turned on, a path with a voltage difference is formed between the first voltage end and the second voltage end through the light source module, the first switch module, and the resistor R2. The voltage of the fourth voltage end is the product of the resistance of the resistor R2 and the first current threshold, that is, the voltage of the fourth voltage end is a voltage threshold of the resistor R2. The in-phase input end of the operational amplifier A1 is connected to the first end of the resistor R2, and the inverting input end of the operational amplifier A1 is connected to the fourth voltage end. In this way, when a current flowing through the resistor R2 exceeds the first current threshold, the operational amplifier A1 outputs a high-level signal, to control the first switch module to be turned off.

Optionally, a second output end of the first sampling control module is connected to the first voltage end, and the first sampling control module controls the first voltage end to stop output when the first current value exceeds the first current threshold.

In this application, when the light source module works as an optical proximity light source, the first sampling control module may control the first voltage end to stop output when the current value of the light source module exceeds the first current threshold, to avoid that light emitted by the light source module is excessively strong and endangers human eye safety.

Optionally, the light source circuit further includes a second switch module. The output end of the TOF drive module is connected to a control end of the second switch module, to control turn-on and turn-off of the second switch module. A first end of the second switch module is connected to the second end of the light source module, a second end of the second switch module is connected to a fifth voltage end, and a voltage of the fifth voltage end is less than the voltage of the first voltage end, so that the light source module emits light when the second switch module is turned on.

In this application, the second switch module is connected between the second end of the light source module and the fifth voltage end. The voltage of the fifth voltage end is less than the voltage of the first voltage end. When the second switch module is turned on, a path with a voltage difference is formed between the first voltage end and the fifth voltage end through the light source module and the second switch module, so that the light source module emits light. The output end of the TOF drive module is connected to the control end of the second switch module, and the TOF drive module may control the second switch module to be turned on to drive the light source module to emit light.

Optionally, the light source circuit further includes a second sampling control module. A first end of the second sampling control module is connected to the first voltage end, and a second end of the second sampling control module is connected to the first end of the light source module. An output end of the second sampling control module is connected to the first voltage end. When the TOF drive module drives the light source module to emit light, the second sampling control module detects a current value of the light source module to obtain a second current value. When the second current value exceeds a second current threshold, the second sampling control module controls the first voltage end to stop output. When the optical proximity drive module drives the light source module to emit light, the second sampling control module detects a current value of the light source module to obtain a third current value. When the third current value exceeds a third current threshold, the second sampling control module controls the first voltage end to stop output.

In this application, the third current threshold may be equal to the first current threshold. When the light source module works as an optical proximity light source, the second sampling control module may control the first voltage end to stop output when the current value of the light source module exceeds the third current threshold; and when the light source module works as a TOF light source, the second sampling control module may further control the first voltage end to stop output when the current value of the light source module exceeds the second current threshold, to avoid that light emitted by the light source module is excessively strong and endangers human eye safety.

Optionally, the output end of the TOF drive module is configured to output a first preset voltage to the second end of the light source module, and the first preset voltage is less than the voltage of the first voltage end, to drive the light source module to emit light. The output end of the optical proximity drive module is configured to output a second preset voltage to the second end of the light source module, and the second preset voltage is less than the voltage of the first voltage end, to drive the light source module to emit light.

In this application, the output end of the TOF drive module is connected to the second end of the light source module. When the output end of the TOF drive module outputs the first preset voltage, and the first preset voltage is less than the voltage of the first voltage end, a path with a voltage difference is formed between the first voltage end and the output end of the TOF drive module through the light source module, so that the TOF drive module drives the light source module to emit light. When the output end of the optical proximity drive module outputs the second preset voltage, and the second preset voltage is less than the voltage of the first voltage end, a path with a voltage difference is formed between the first voltage end and the output end of the optical proximity drive module through the light source module, so that the optical proximity drive module drives the light source module to emit light.

According to a second aspect, a terminal is provided, including the light source circuit according to the first aspect.

Technical effects achieved in the second aspect are similar to the technical effects achieved through the corresponding technical means in the first aspect, and details are not described herein again.

Figure 1:
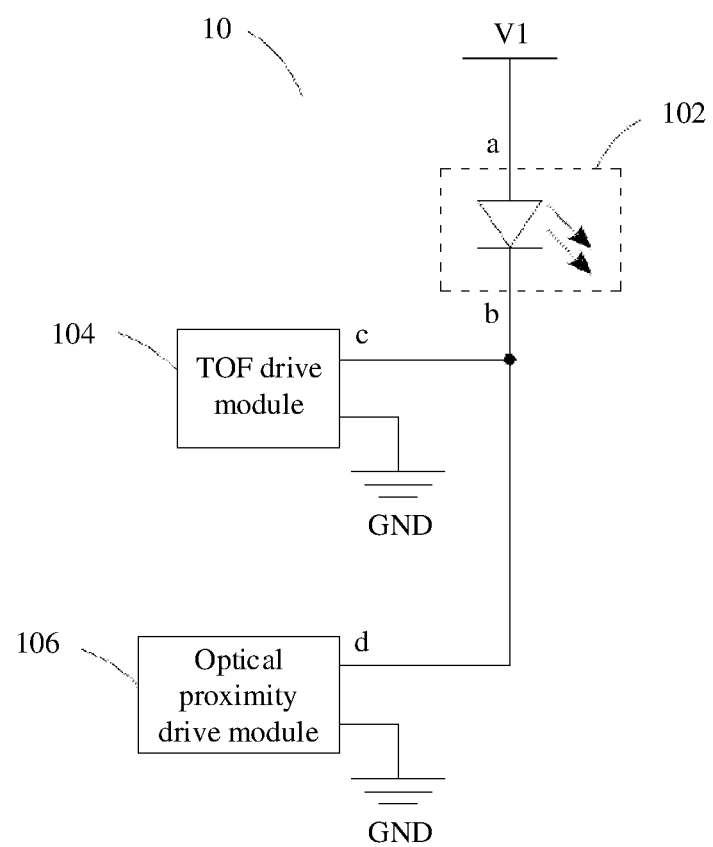
FIG. 1 is a schematic diagram of a structure of a first light source circuit according to an embodiment of this application.

Meanings represented by reference signs in the accompanying drawings are respectively as follows:

10. light source circuit; 102. light source module; 104. TOF drive module; 106. optical proximity drive module; 110. first switch module; 112. first turn-off circuit; 114. first current-limiting circuit; 120. first sampling control module; 122. first current detector; 124. first controller; 130. second switch module; 132. second turn-off circuit; 134. second current-limiting circuit; 140. third sampling control module; 142. third current detector; 144. third controller; 150. second sampling control module; 152. second current detector; 154. second controller; 156. switch component; 20. terminal; 202. TOF receiving module; 204. optical proximity receiving module; 206. front-facing camera.

DETAILED DESCRIPTION OF ILLUSTRATIVE EMBODIMENTS

To make the objectives, technical solutions, and advantages of this application clearer, the following further describes implementations of this application in detail with reference to the accompanying drawings.

It should be understood that "a plurality of" mentioned in this application refers to two or more. In the descriptions of this application, unless otherwise stated, "/" means "or". For example, A/B may indicate A or B. The term "and/or" in this specification is merely an association relationship for describing associated objects, and indicates that three relationships may exist. For example, A and/or B may indicate the following three cases: Only A exists, both A and B exist, and only B exists. In addition, for ease of clearly describing the technical solutions of this application, the words such as "first" and "second" are used to distinguish between same or similar items whose functions are basically the same. A person skilled in the art may understand that the words such as "first" and "second" do not limit a quantity or an execution order, and the words such as "first" and "second" do not necessarily indicate a specific difference.

Before embodiments of this application are described in detail, an application scenario in embodiments of this application is first described.

A terminal usually has an object recognition function and a proximity detection function. For example, when the terminal needs to perform facial unlocking or facial payment, the terminal needs to detect depth information of a face, to recognize the face. When the terminal needs to make a voice call, the terminal needs to detect proximity of a human body. In this way, the terminal may respond accordingly when detecting the proximity of the human body, to avoid that the human body accidentally touches the terminal, so as to avoid affecting user experience.

In a related technology, the object recognition function of the terminal is usually implemented by a TOF light source module, a TOF drive module, and a TOF receiving module. When the terminal needs to recognize an object, the TOF drive module drives the TOF light source module to work, so that the TOF light source module emits light to the to-be-recognized object. The TOF receiving module may receive reflected light formed when the emitted light is irradiated onto the object. The terminal may obtain depth information of the object by detecting a time of flight (that is, a round trip time) of the light, to recognize the object.

The proximity detection function of the terminal is usually implemented by an optical proximity light source module, an optical proximity drive module, and an optical proximity receiving module. When the terminal needs to perform proximity detection, the optical proximity drive module drives the optical proximity light source module to work, so that the optical proximity light source module emits light. The optical proximity receiving module detects reflected light of the emitted light. When the optical proximity receiving module detects the reflected light, it indicates that an object approaches the terminal.

However, in the related technology, the terminal uses a relatively large quantity of components to implement the object recognition function and the proximity detection function. This is not conducive to improving integration of the terminal.

Therefore, embodiments of this application provide a light source circuit and a terminal, to reduce components used for an object recognition function and a proximity detection function, so as to help improve integration of a terminal.

The following describes in detail a light source circuit provided in an embodiment of this application.

Embodiment 1

FIG. 1 is a schematic diagram of a structure of a light source circuit 10 according to an embodiment of this application. The light source circuit 10 may be used in a terminal. Referring to FIG. 1, the light source circuit 10 includes a light source module 102, a TOF drive module 104, and an optical proximity drive module 106.

The light source module 102 is configured to emit light when being powered on. The light source module 102 may be a light source for emitting infrared light, for example, an infrared light-emitting diode, or may be a light source for emitting near-infrared light. A first end a of the light source module 102 is connected to a first voltage end. The first voltage end herein is a terminal configured to output a voltage. For example, the first voltage end may be a terminal that is of a power module in the terminal and that is configured to output a voltage. "First" in the first voltage end is used for differentiation from the following second voltage end and third voltage end. In the embodiment shown in FIG. 1, the first voltage end is identified by using a sign "V1". For ease of understanding, in the following description, the first voltage end is referred to as a "first voltage end V1". Usually, the first voltage end V1 is configured to output a positive direct current voltage, and the first end a of the light source module 102 may be an anode of an infrared light-emitting diode.

An output end c of the TOF drive module 104 is connected to a second end b of the light source module 102. A ground end of the TOF drive module 104 may be connected to a ground cable GND. When the TOF drive module 104 works, the output end c of the TOF drive module 104 may output an electrical signal used to drive the light source module 102 to emit light, so that a current passes through the light source module 102.

An output end d of the optical proximity drive module 106 is connected to the second end b of the light source module 102. A ground end of the optical proximity drive module 106 may be connected to a ground cable GND. When the optical proximity drive module 106 works, the output end d of the optical proximity drive module 106 may output an electrical signal used to drive the light source module 102 to emit light, so that a current passes through the light source module 102. At a same moment, at most one of the TOF drive module 104 and the optical proximity drive module 106 drives the light source module 102 to emit light.

After the light source circuit 10 in this embodiment of this application is used in the terminal, when the terminal needs to recognize an object, the TOF drive module 104 drives the light source module 102 to work, so that the light source module 102 emits light to the to-be-recognized object. A TOF receiving module may receive reflected light formed when the emitted light is irradiated onto the object. The terminal may obtain depth information of the object by detecting a time of flight of the light, to recognize the object. When the terminal needs to perform proximity detection, the optical proximity drive module 106 drives the light source module 102 to work, so that the light source module 102 emits light. An optical proximity receiving module detects reflected light of the emitted light. When the optical proximity receiving module detects the reflected light, it indicates that an object approaches the terminal. Object recognition includes facial unlocking and facial payment. An application scenario of the terminal may be shown in FIG. 2 and FIG. 3.

Figure 2:
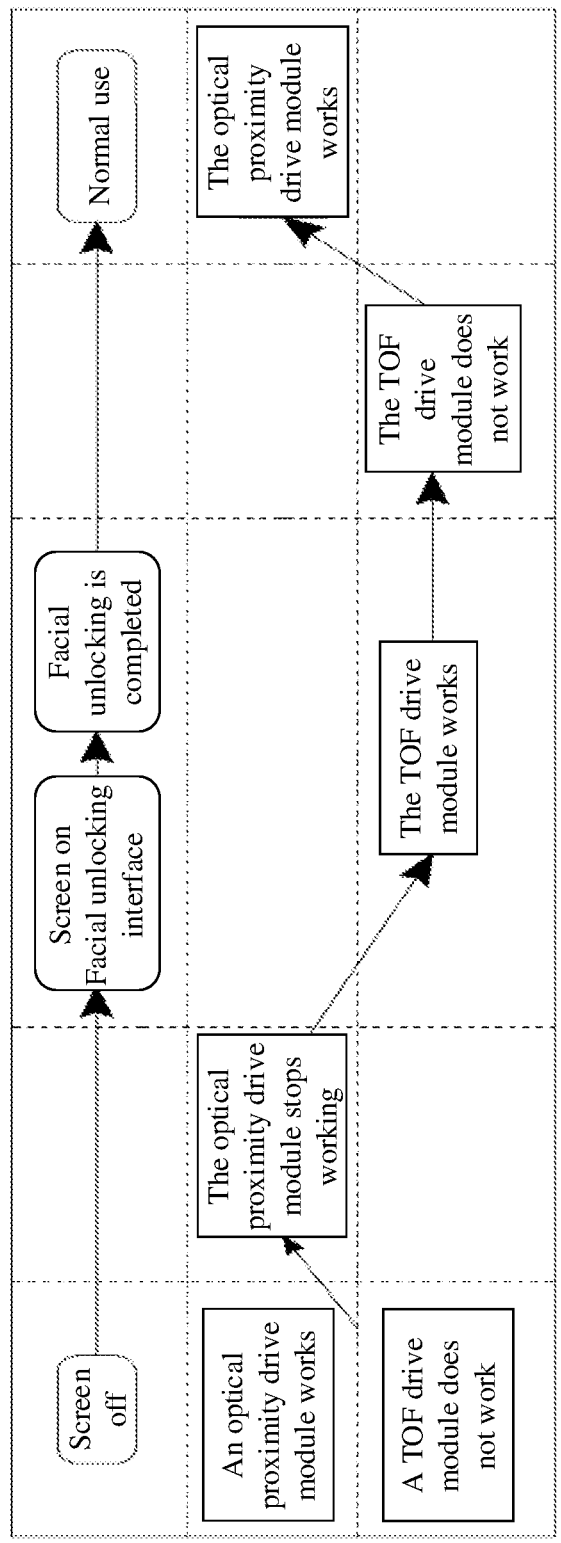
FIG. 2 is a schematic diagram of a working process of a first light source circuit according to an embodiment of this application.

As shown in FIG. 2, when the terminal is in a screen-off state, the optical proximity drive module 106 may be in a working state, to drive the light source module 102 to emit light. In this case, the light source module 102 works as an optical proximity light source. When the terminal needs to be screen-on and enter a facial unlocking interface, the optical proximity drive module 106 stops working. After the optical proximity drive module 106 stops working, the terminal is screen-on and enters the facial unlocking interface. In this case, the TOF drive module 104 works, and the light source module 102 works as a TOF light source. After facial unlocking is completed, the terminal starts to be used normally. In this case, the TOF drive module 104 stops working, and the optical proximity drive module 106 starts to work. In this process, one of the TOF drive module 104 and the optical proximity drive module 106 drives the light source module 102 to emit light.

Figure 3:
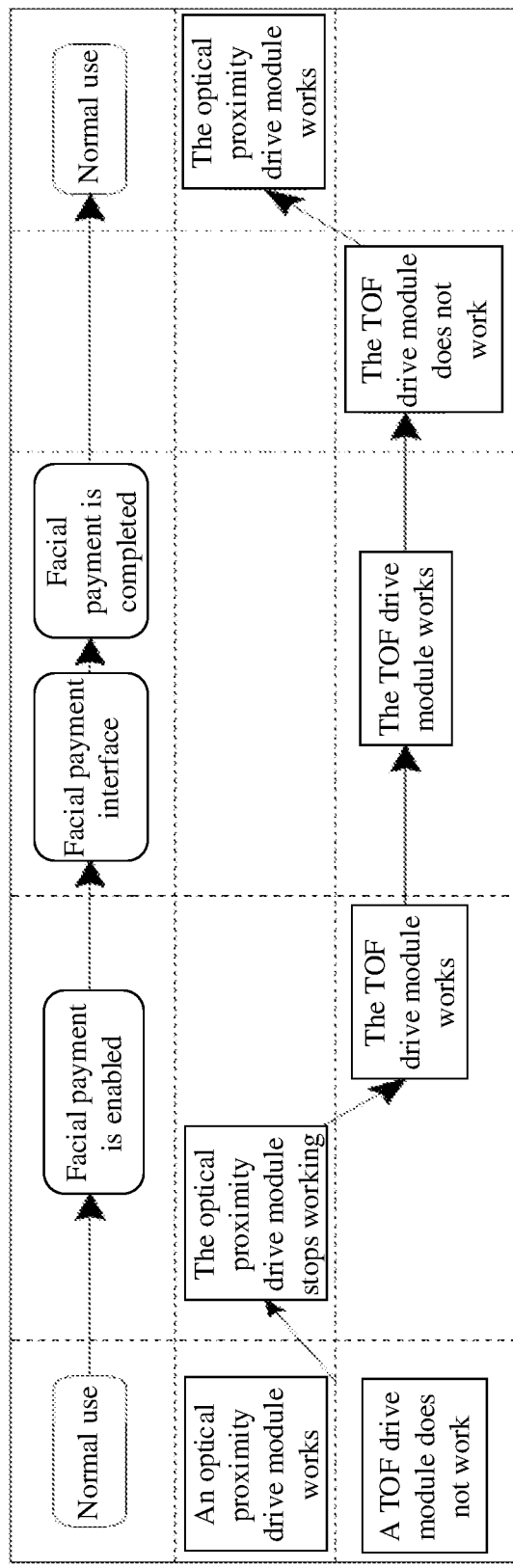
FIG. 3 is a schematic diagram of a working process of a second light source circuit according to an embodiment of this application.

As shown in FIG. 3, when the terminal is in a normally used state, the optical proximity drive module 106 may be in a working state, to drive the light source module 102 to emit light. In this case, the light source module 102 works as an optical proximity light source. When the terminal needs to perform facial payment, the facial payment is enabled. In this case, the optical proximity drive module 106 stops working, the TOF drive module 104 starts to work, the light source module 102 works as a TOF light source, and the terminal enters a facial payment interface. When the terminal is in the facial payment interface, the TOF drive module 104 continues to work, until facial payment is completed. After facial payment is completed, the terminal starts to be used normally. In this case, the TOF drive module 104 stops working, and the optical proximity drive module 106 starts to work. In this process, one of the TOF drive module 104 and the optical proximity drive module 106 drives the light source module 102 to emit light.

Certainly, in some other application scenarios, when the terminal is in a screen-off state or a normally used state, the optical proximity drive module 106 may alternatively be in a non-working state. When the terminal enters a call mode, the optical proximity drive module 106 starts to work. When the terminal exits from the call mode, the optical proximity drive module 106 stops working.

In this embodiment of this application, the light source module 102 may serve as a TOF light source for implementing an object recognition function, and may serve as an optical proximity light source for implementing a proximity detection function, to reduce components used when the terminal implements the object recognition function and the proximity detection function, so as to help improve integration of the terminal.

It should be understood that, in the foregoing embodiment, for ease of understanding, the first voltage end V1 is introduced to describe a connection relationship and a working process of the light source circuit 10. However, this does not represent that the light source circuit 10 includes the first voltage end V1. Actually, the first voltage end V1 exists as a surrounding element of the light source circuit 10 in this embodiment of this application. In other words, the first voltage end V1 is not a part of the light source circuit 10, and introduction of the first voltage end V1 in the foregoing description should not be construed as a limitation on the light source circuit 10.

In some embodiments, as shown in FIG. 1, a path may be formed between the first voltage end V1 and the output end c of the TOF drive module 104, or a path may be formed between the first voltage end V1 and the output end d of the optical proximity drive module 106, so that at most one of the TOF drive module 104 and the optical proximity drive module 106 drives the light source module 102 to emit light.

A working process in which the TOF drive module 104 drives the light source module 102 to emit light is as follows: The output end c of the TOF drive module 104 outputs a first preset voltage to the second end b of the light source module 102, where the first preset voltage is less than a voltage of the first voltage end V1. In this way, when the TOF drive module 104 outputs the first preset voltage, a voltage difference is formed on the path between the first voltage end V1 and the output end c of the TOF drive module 104, to form a current flowing through the light source module 102, so that the light source module 102 emits light.

A working process in which the optical proximity drive module 106 drives the light source module 102 to emit light is as follows: The output end d of the optical proximity drive module 106 outputs a second preset voltage to the second end b of the light source module 102, where the second preset voltage is less than a voltage of the first voltage end V1. In this way, when the optical proximity drive module 106 outputs the second preset voltage, a voltage difference is formed on the path between the first voltage end V1 and the output end d of the optical proximity drive module 106, to form a current flowing through the light source module 102, so that the light source module 102 emits light.

Embodiment 2

In the embodiment shown in FIG. 1, a path is formed between the first voltage end V1 and an output end of a drive module (including the TOF drive module 104 and the optical proximity drive module 106). Therefore, an output voltage of the drive module affects luminance of light emitted by the light source module 102. In this case, when the output voltage of the drive module fluctuates, the luminance of the light emitted by the light source module 102 is unstable. To improve stability of luminance of emitted light when the light source module 102 works, the light source circuit 10 may further include a switch module. The drive module controls light emission of the light source module 102 by controlling turn-on and turn-off of a switch.

Specifically, the second end b of the light source module 102 may be connected to a second voltage end through the switch module, a voltage of the second voltage end is less than the voltage of the first voltage end, and the TOF drive module 104 or the optical proximity drive module 106 drives the switch module to be turned on to enable the light source module 102 to emit light. In the following description, implementations of the light source circuit 10 are separately described by using two cases: a case that "the optical proximity drive module 106 drives the switch module to be turned on to enable the light source module 102 to emit light" and a case that "the TOF drive module 104 drives the switch module to be turned on to enable the light source module 102 to emit light", as examples.

Figure 4:
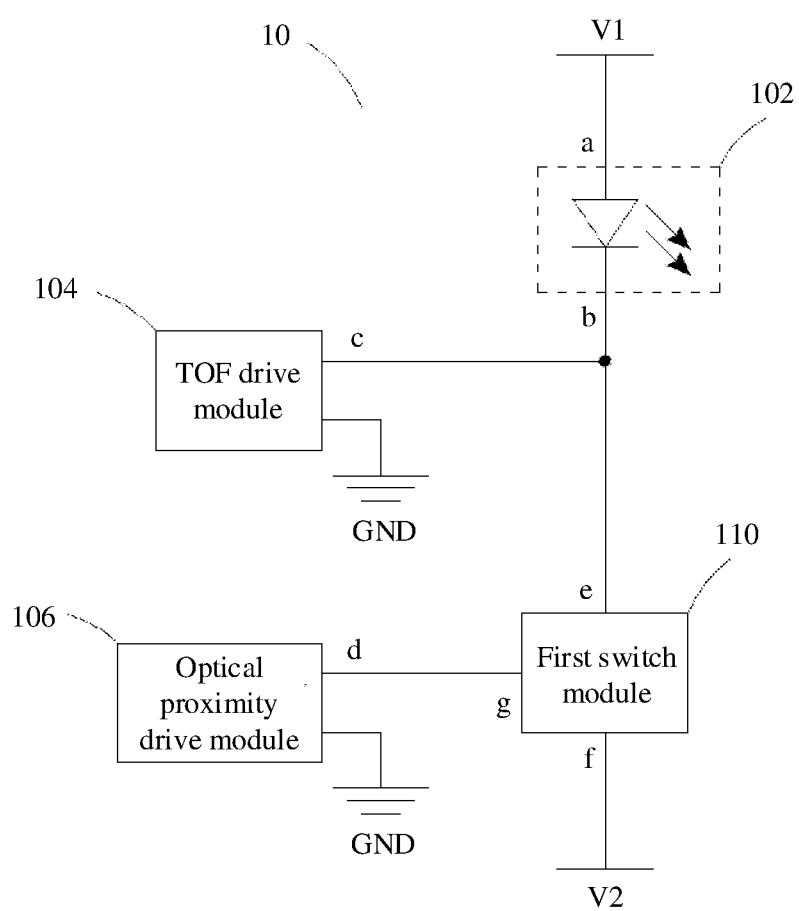
FIG. 4 is a schematic diagram of a structure of a second light source circuit according to an embodiment of this application.

For the first case, details are as follows:

The optical proximity drive module 106 drives the switch module to be turned on to enable the light source module 102 to emit light. As shown in FIG. 4, in this case, the light source circuit 10 further includes a first switch module 110.

The first switch module 110 has a first end e, a second end f, and a control end g. The control end g of the first switch module 110 may control connection and disconnection between the first end e and the second end f of the first switch module 110. The output end d of the optical proximity drive module 106 is connected to the control end g of the first switch module 110, to control connection and disconnection between the first end e and the second end f of the first switch module 110, that is, control turn-on and turn-off of the first switch module 110. The first end e of the first switch module 110 is connected to the second end b of the light source module 102, and the second end f of the first switch module 110 is connected to the second voltage end. The second voltage end herein is a terminal configured to output a voltage. For example, the second voltage end may be a terminal that is of the power module in the terminal and that is configured to output a voltage. In the embodiments shown in FIG. 4 and other accompanying drawings, the second voltage end is identified by using a sign "V2". For ease of understanding, in the following description, the second voltage end is referred to as a "second voltage end V2". A voltage of the second voltage end V2 is less than the voltage of the first voltage end V1, so that when the first switch module 110 is turned on, a path with a voltage difference is formed between the first voltage end V1 and the second voltage end V2, to form a current flowing through the light source module 102, so that the light source module 102 emits light. In some specific embodiments, the second voltage end may be a ground cable GND.

In this embodiment, based on the foregoing application scenario, when the optical proximity drive module 106 works, the optical proximity drive module 106 may drive the first end e and the second end f of the first switch module 110 to be connected. In this case, a path that has a voltage difference and that passes through the light source module 102 and the first switch module 110 is formed between the first voltage end V1 and the second voltage end, and the light source module 102 emits light.

With reference to specific embodiments, the following describes a plurality of possible structures of the first switch module 110.

Figure 5:
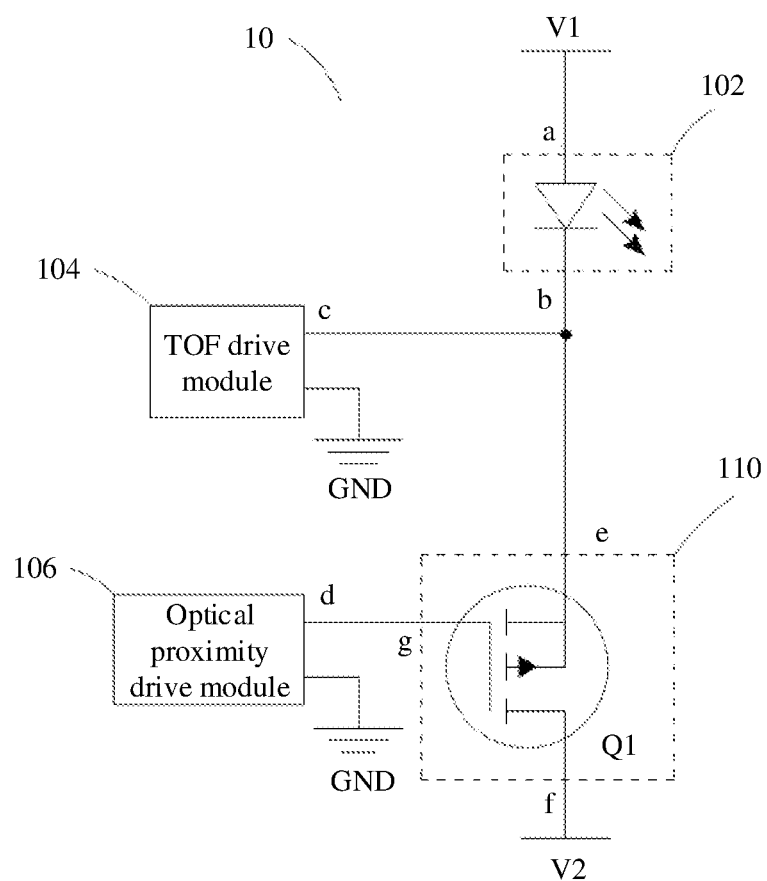
FIG. 5 is a schematic diagram of a structure of a third light source circuit according to an embodiment of this application.

In a first possible structure, as shown in FIG. 5, the first switch module 110 includes a transistor Q1. A first end (source) of the transistor Q1 is connected to the second end b of the light source module 102, a second end (drain) of the transistor Q1 is connected to the second voltage end V2, and a control end (gate) of the transistor Q1 is connected to the output end d of the optical proximity drive module 106. The transistor Q1 may be a P-type metal oxide semiconductor (metal oxide semiconductor, MOS) field-effect transistor. In this way, when the output end d of the optical proximity drive module 106 outputs a low-level signal, the first end and the second end of the transistor Q1 are connected. In this case, a current flows out from the first voltage end V1, and flows into the second voltage end V2 through the light source module 102 and the transistor Q1, and the light source module emits light.

Figure 6:
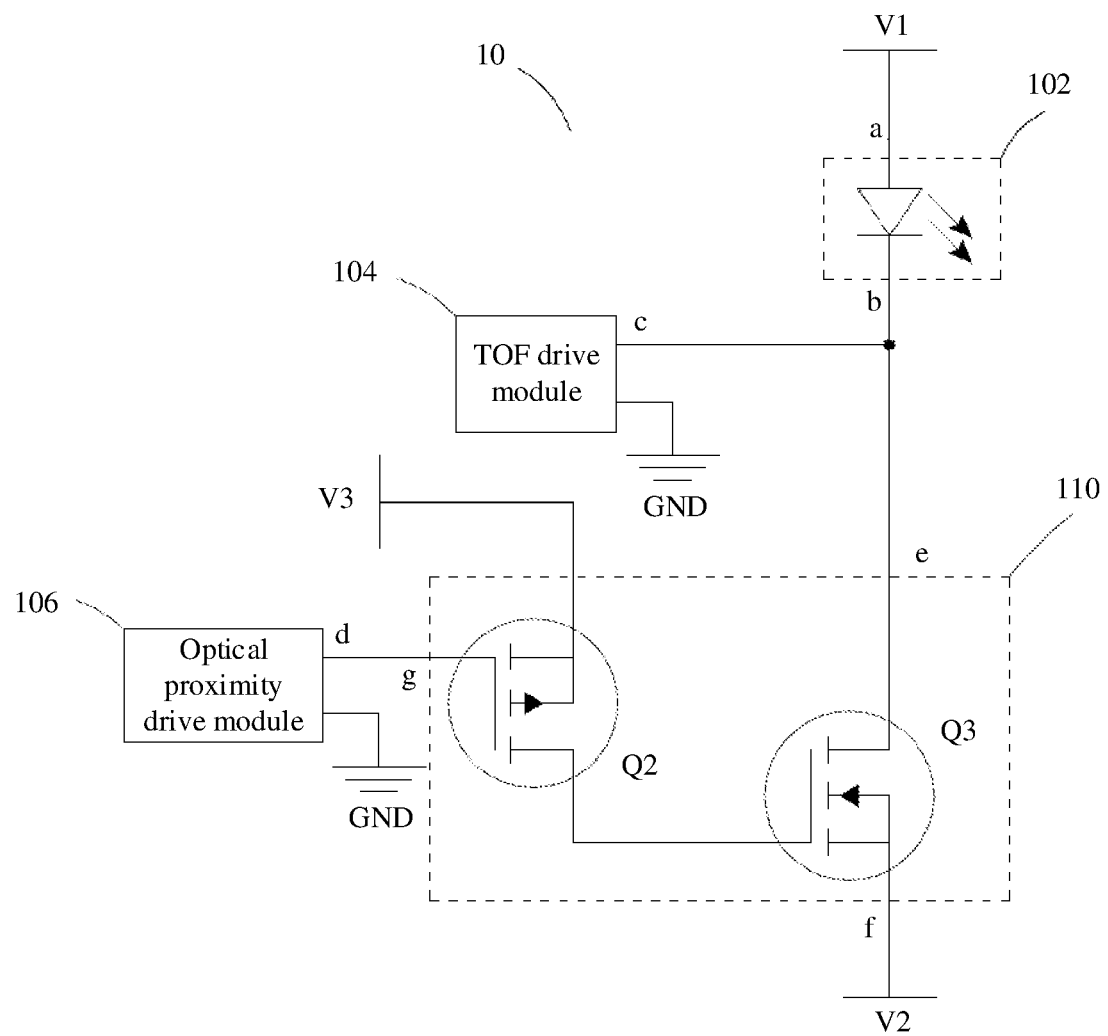
FIG. 6 is a schematic diagram of a structure of a fourth light source circuit according to an embodiment of this application.

In a second possible structure, as shown in FIG. 6, the first switch module 110 includes a transistor Q2 and a transistor Q3. A first end (source) of the transistor Q2 is connected to a third voltage end. The third voltage end herein is a terminal configured to output a voltage. For example, the third voltage end may be a terminal that is of the power module in the terminal and that is configured to output a voltage. In the embodiments shown in FIG. 6 and other accompanying drawings, the third voltage end is identified by using a sign "V3". For ease of understanding, in the following description, the third voltage end is referred to as a "third voltage end V3". In addition, a fourth voltage end to a ninth voltage end in the following embodiments each are a terminal configured to output a voltage, and reference signs according to a same rule are used. Therefore, for ease of understanding, the fourth voltage end to the ninth voltage end are respectively referred to as a "fourth voltage end V4", a "fifth voltage end V5", a "sixth voltage end V6", a "seventh voltage end V7", an "eighth voltage end V8", and a "ninth voltage end V9". Details are not described again. A second end (drain) of the transistor Q2 is connected to a control end (gate) of the transistor Q3, and a control end (gate) of the transistor Q2 is connected to the output end d of the optical proximity drive module 106. A first end (drain) of the transistor Q3 is connected to the second end b of the light source module 102, and a second end (source) of the transistor Q3 is connected to the second voltage end V2.

The transistor Q2 may be a P-type MOS transistor, and the transistor Q3 may be an N-type MOS transistor. In this way, when the output end d of the optical proximity drive module 106 outputs a low-level signal, the first end and the second end of the transistor Q2 are connected. In this case, the control end of the transistor Q3 is connected to the third voltage end V3 through the transistor Q2. A voltage of the third voltage end V3 may be greater than a threshold voltage of the transistor Q3, so that when the transistor Q2 is turned on, and the voltage of the third voltage end V3 is input to the control end of the transistor Q3, the first end and the second end of the transistor Q3 are connected. In this case, a current flows out from the first voltage end V1, and flows into the second voltage end V2 through the light source module 102 and the transistor Q3, and the light source module emits light.

Figure 7:
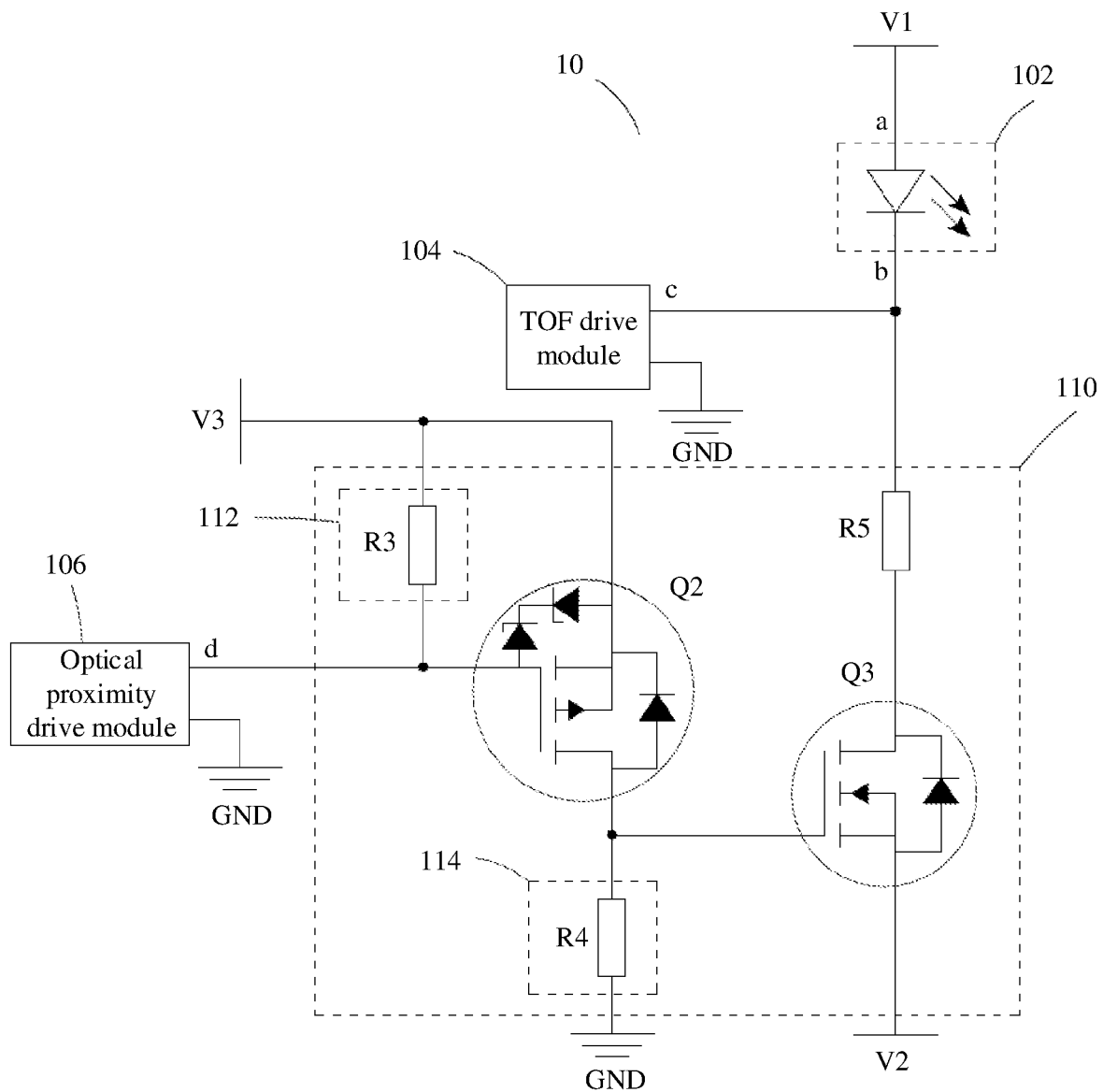
FIG. 7 is a schematic diagram of a structure of a fifth light source circuit according to an embodiment of this application.

In some embodiments, as shown in FIG. 7, the first switch module 110 further includes a first turn-off circuit 112 and a first current-limiting circuit 114.

A first end of the first turn-off circuit 112 is connected to the first end of the transistor Q2, and a second end of the first turn-off circuit 112 is connected to the control end of the transistor Q2. The first turn-off circuit 112 may be a circuit that includes a resistor R3 and that has specific resistance. The first turn-off circuit 112 is connected between the first end of the transistor Q2 and the control end of the transistor Q2. When the optical proximity drive module 106 no longer outputs the low-level signal, the control end of the transistor Q2 is connected to the third voltage end V3 through the first turn-off circuit 112, a voltage of the control end of the transistor Q2 is the same as a voltage of the first end of the transistor Q2, and the transistor Q2 is turned off at a high level. In this case, the control end of the transistor Q3 is no longer connected to the third voltage end V3, and the transistor Q3 is turned off at a low level. In this way, when the optical proximity drive module 106 does not output the low-level signal, it can be ensured that the first switch module 110 is turned off.

A first end of the first current-limiting circuit 114 is connected to the second end of the transistor Q2, and a second end of the first current-limiting circuit 114 is connected to a ground cable GND. The first current-limiting circuit 114 may be a circuit that includes a resistor R4 and that has specific resistance. The first current-limiting circuit 114 is connected between the second end of the transistor Q2 and the ground cable GND, to prevent a current flowing through the transistor Q2 from being excessively high, so as to avoid an electric energy waste.

The first switch module 110 may further include a resistor R5, a first end of the resistor R5 is connected to the second end b of the light source module 102, and a second end of the resistor R5 is connected to the first end of the transistor Q3. In this way, intensity of light emitted by the light source module 102 serving as an optical proximity light source when the transistor Q3 is turned on may be adjusted by adjusting resistance of the resistor R5.

In some embodiments, as shown in FIG. 7, the transistor Q2 and the transistor Q3 serve as MOS transistors and further have parasitic diodes.

Parasitic diodes in the transistor Q2 includes two voltage regulator diodes and one protection diode. An anode of the protection diode is connected to the second end of the transistor Q2, and a cathode of the protection diode is connected to the first end of the transistor Q2. In this way, when a voltage difference between the third voltage end V3 and the ground cable GND is relatively large, and the transistor Q2 may be burned out, the voltage difference between the third voltage end V3 and the ground cable GND first causes a breakdown of the protection diode. The protection diode that breaks down is equivalent to a conducting wire, and may conduct a large current signal to the ground cable GND, to prevent the transistor Q2 from being burned out. Cathodes of the two voltage regulator diodes are connected, an anode of one voltage regulator diode is connected to the first end of the transistor Q2, and an anode of the other voltage regulator diode is connected to the control end of the transistor Q2. In this way, the two voltage regulator diodes can maintain the voltages of the first end and the control end of the transistor Q2 to be relatively stable, to improve working stability of the transistor Q2.

A parasitic diode in the transistor Q3 includes one protection diode. An anode of the protection diode is connected to the second end of the transistor Q3, and a cathode of the protection diode is connected to the first end of the transistor Q3. In this way, when a voltage difference between the first voltage end V1 and the second voltage end V2 is relatively large, and the transistor Q3 may be burned out, the voltage difference between the first voltage end V1 and the second voltage end V2 first causes a breakdown of the protection diode. The protection diode that breaks down is equivalent to a conducting wire, and may conduct a large current signal to the second voltage end V2, to prevent the transistor Q3 from being burned out.

Figure 8:
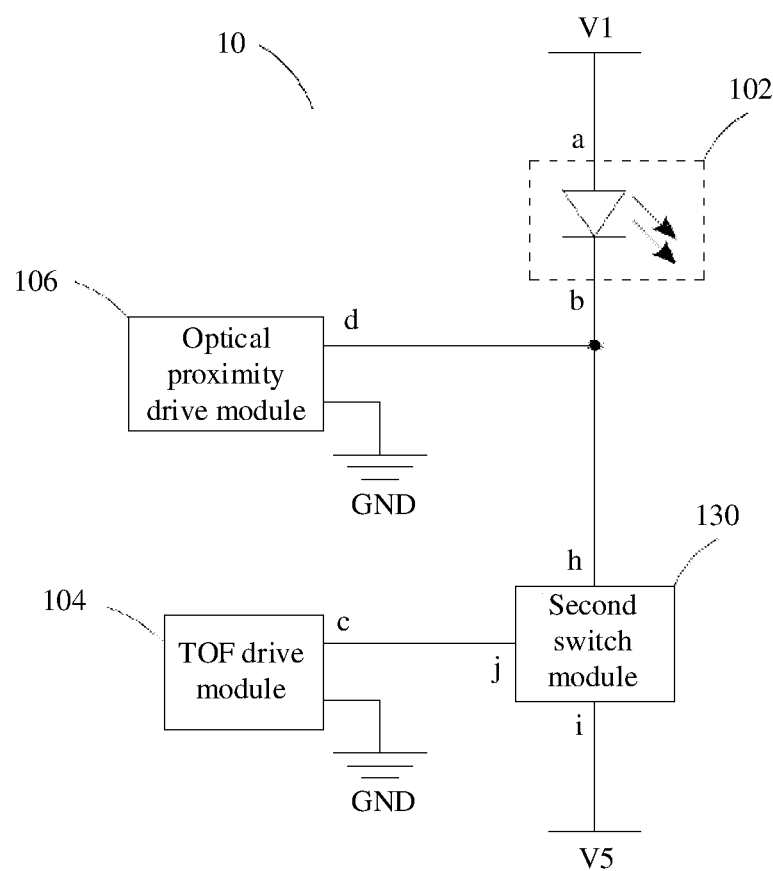
FIG. 8 is a schematic diagram of a structure of a sixth light source circuit according to an embodiment of this application.

For the second case, details are as follows:

The TOF drive module 104 drives the switch module to be turned on to enable the light source to emit light. As shown in FIG. 8, in this case, the light source circuit 10 further includes a second switch module 130.

The second switch module 130 has a first end h, a second end i, and a control end j. The control end j of the second switch module 130 may control connection and disconnection between the first end h and the second end i of the second switch module 130. The output end c of the TOF drive module 104 is connected to the control end j of the second switch module 130, to control connection and disconnection between the first end h and the second end i of the second switch module 130, that is, control turn-on and turn-off of the second switch module 130. The first end h of the second switch module 130 is connected to the second end b of the light source module 102, and the second end i of the second switch module 130 is connected to a fifth voltage end V5. A voltage of the fifth voltage end V5 is less than the voltage of the first voltage end V1, so that when the second switch module 130 is turned on, a path with a voltage difference is formed between the first voltage end V1 and the fifth voltage end V5, to form a current flowing through the light source module 102, so that the light source module 102 emits light. In some specific embodiments, the fifth voltage end V5 may be a ground cable GND.

In this embodiment, based on the foregoing application scenario, when the TOF drive module 104 works, the TOF drive module 104 may drive the first end h and the second end i of the second switch module 130 to be connected. In this case, a path that has a voltage difference and that passes through the light source module 102 and the second switch module 130 is formed between the first voltage end V1 and the fifth voltage end V5, and the light source module emits light.

Figure 9:
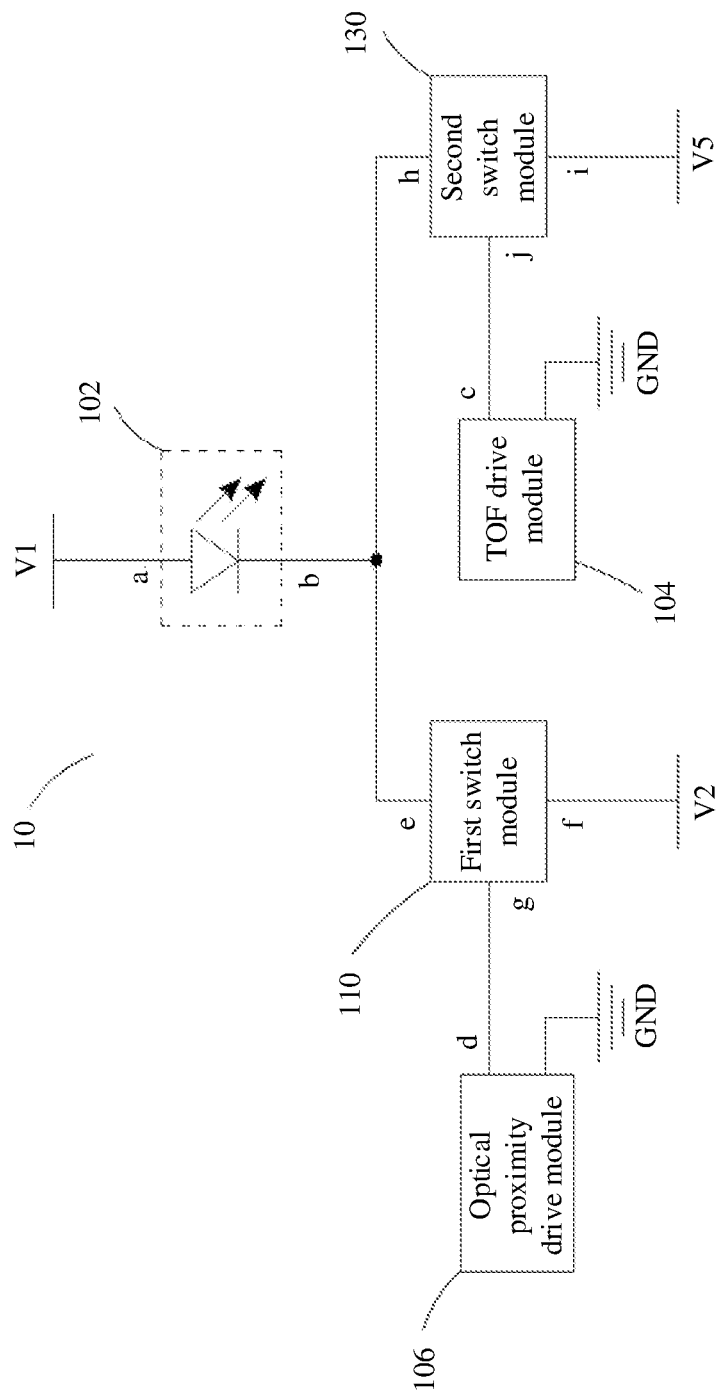
FIG. 9 is a schematic diagram of a structure of a seventh light source circuit according to an embodiment of this application.

It may be understood that, the case that "the optical proximity drive module 106 drives the switch module to be turned on to enable the light source module 102 to emit light" and the case that "the TOF drive module 104 drives the switch module to be turned on to enable the light source module 102 to emit light" may be mutually combined. For example, in an embodiment shown in FIG. 9, the light source circuit 10 includes all of the light source module 102, the optical proximity drive module 106, the first switch module 110, the TOF drive module 104, and the second switch module 130. In this way, when the optical proximity drive module 106 drives the first switch module 110 to be turned on, the light source module 102 emits light and works as an optical proximity light source. When the TOF drive module 104 drives the second switch module 130 to be turned on, the light source module 102 emits light and works as a TOF light source.

With reference to specific embodiments, the following describes a plurality of possible structures of the second switch module 130.

Figure 10:
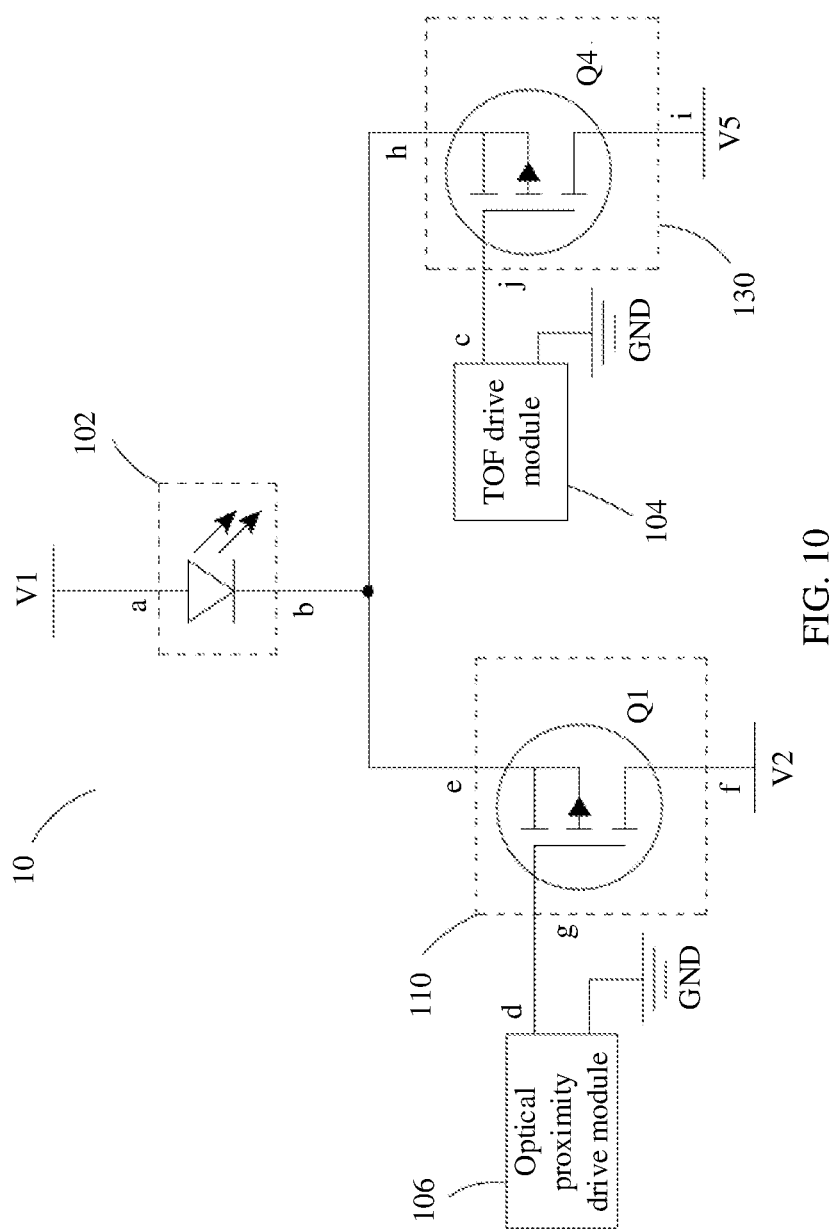
FIG. 10 is a schematic diagram of a structure of an eighth light source circuit according to an embodiment of this application.

In a first possible structure, as shown in FIG. 10, the second switch module 130 includes a transistor Q4. A first end (source) of the transistor Q4 is connected to the second end b of the light source module 102, a second end (drain) of the transistor Q4 is connected to the fifth voltage end V5, and a control end (gate) of the transistor Q4 is connected to the output end c of the TOF drive module 104. The transistor Q4 may be a P-type metal oxide semiconductor (metal oxide semiconductor, MOS) field-effect transistor. In this way, when the output end c of the TOF drive module 104 outputs a low-level signal, the first end and the second end of the transistor Q4 are connected. In this case, a current flows out from the first voltage end V1, and flows into the fifth voltage end V5 through the light source module 102 and the transistor Q4, and the light source module emits light.

Figure 11:
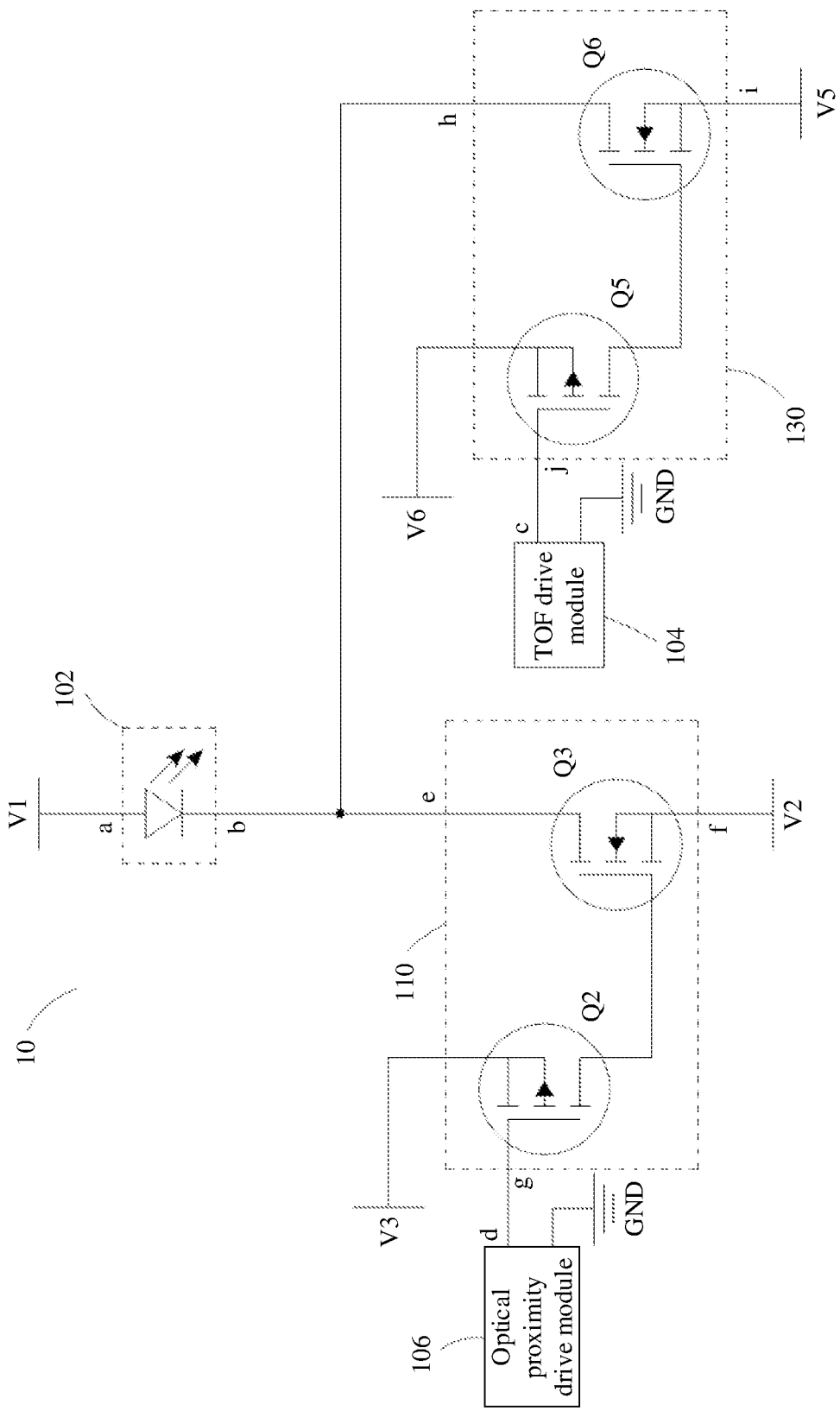
FIG. 11 is a schematic diagram of a structure of a ninth light source circuit according to an embodiment of this application.

In a second possible structure, as shown in FIG. 11, the second switch module 130 includes a transistor Q5 and a transistor Q6. A first end (source) of the transistor Q5 is connected to a sixth voltage end V6. A second end (drain) of the transistor Q5 is connected to a control end (gate) of the transistor Q6, and a control end (gate) of the transistor Q5 is connected to the output end c of the TOF drive module 104. A first end (drain) of the transistor Q6 is connected to the second end b of the light source module 102, and a second end (source) of the transistor Q6 is connected to the fifth voltage end V5.

The transistor Q5 may be a P-type MOS transistor, and the transistor Q6 may be an N-type MOS transistor. In this way, when the output end c of the TOF drive module 104 outputs a low-level signal, the first end and the second end of the transistor Q5 are connected. In this case, the control end of the transistor Q6 is connected to the sixth voltage end V6 through the transistor Q5. A voltage of the sixth voltage end V6 may be greater than a threshold voltage of the transistor Q6, so that when the transistor Q5 is turned on, and the voltage of the sixth voltage end V6 is input to the control end of the transistor Q6, the first end and the second end of the transistor Q6 are connected. In this case, a current flows out from the first voltage end V1, and flows into the fifth voltage end V5 through the light source module 102 and the transistor Q6, and the light source module emits light.

Figure 12:
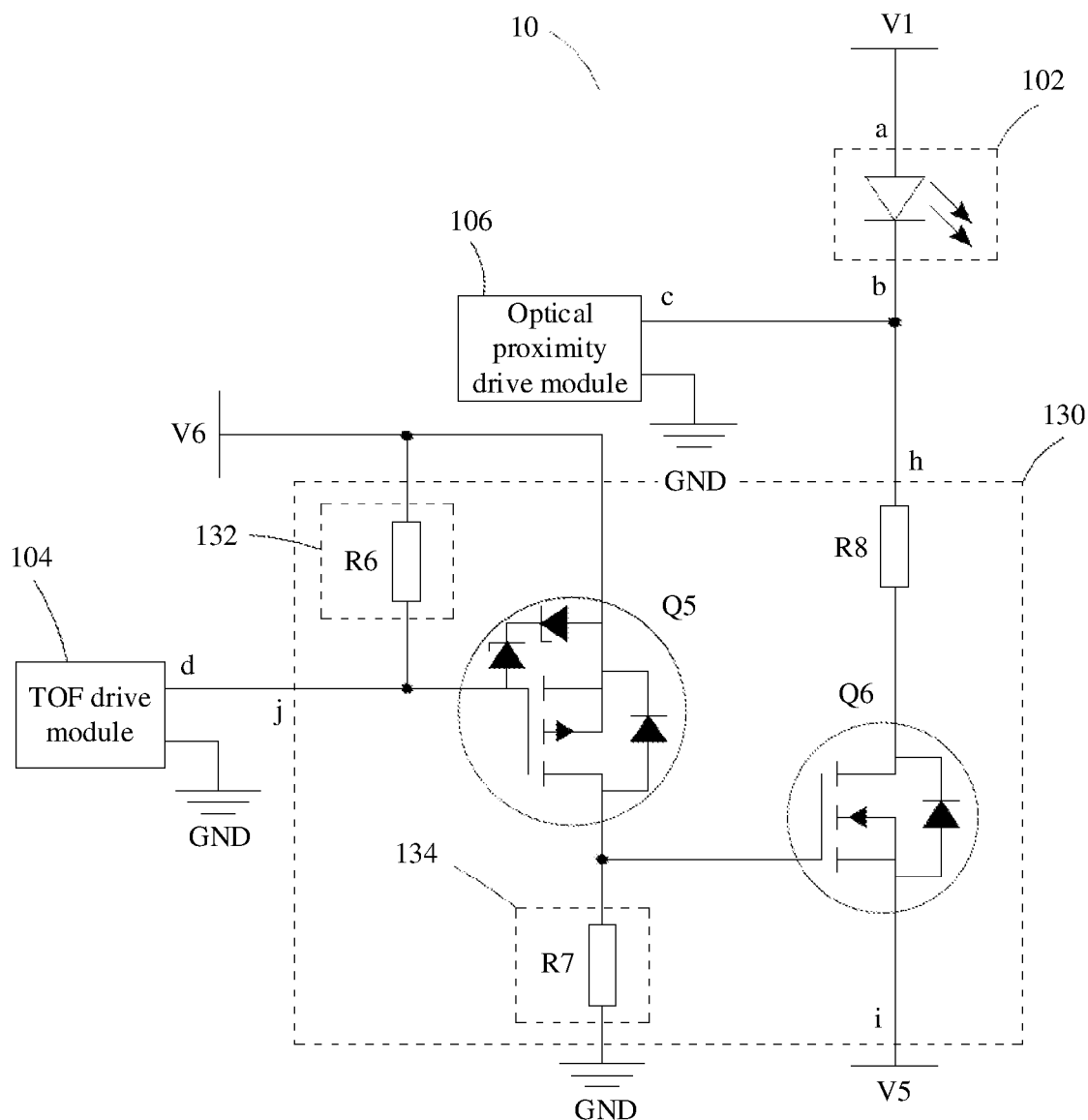
FIG. 12 is a schematic diagram of a structure of a tenth light source circuit according to an embodiment of this application.

In some embodiments, as shown in FIG. 12, the second switch module 130 further includes a second turn-off circuit 132 and a second current-limiting circuit 134.

A first end of the second turn-off circuit 132 is connected to the first end of the transistor Q5, and a second end of the second turn-off circuit 132 is connected to the control end of the transistor Q5. The second turn-off circuit 132 may be a circuit that includes a resistor R6 and that has specific resistance. The second turn-off circuit 132 is connected between the first end of the transistor Q5 and the control end of the transistor Q5. When the TOF drive module 104 no longer outputs the low-level signal, the control end of the transistor Q5 is connected to the sixth voltage end V6 through the second turn-off circuit 132, a voltage of the control end of the transistor Q5 is the same as a voltage of the first end of the transistor Q5, and the transistor Q5 is turned off at a high level. In this case, the control end of the transistor Q6 is no longer connected to the sixth voltage end V6, and the transistor Q6 is turned off at a low level. In this way, when the TOF drive module 104 does not output the low-level signal, it can be ensured that the second switch module 130 is turned off.

A first end of the second current-limiting circuit 134 is connected to the second end of the transistor Q5, and a second end of the second current-limiting circuit 134 is connected to a ground cable GND. The second current-limiting circuit 134 may be a circuit that includes a resistor R7 and that has specific resistance. The second current-limiting circuit 134 is connected between the second end of the transistor Q5 and the ground cable GND, to prevent a current flowing through the transistor Q5 from being excessively high, so as to avoid an electric energy waste.

The second switch module 130 may further include a resistor R8, a first end of the resistor R8 is connected to the second end b of the light source module 102, and a second end of the resistor R8 is connected to the first end of the transistor Q6. In this way, intensity of light emitted by the light source module 102 serving as a TOF light source when the transistor Q6 is turned on may be adjusted by adjusting resistance of the resistor R8.

In some embodiments, as shown in FIG. 12, the transistor Q5 and the transistor Q6 serve as MOS transistors and further have parasitic diodes.

Parasitic diodes in the transistor Q5 includes two voltage regulator diodes and one protection diode. An anode of the protection diode is connected to the second end of the transistor Q5, and a cathode of the protection diode is connected to the first end of the transistor Q5. In this way, when a voltage difference between the sixth voltage end V6 and the ground cable GND is relatively large, and the transistor Q5 may be burned out, the voltage difference between the sixth voltage end V6 and the ground cable GND first causes a breakdown of the protection diode. The protection diode that breaks down is equivalent to a conducting wire, and may conduct a large current signal to the ground cable GND, to prevent the transistor Q5 from being burned out. Cathodes of the two voltage regulator diodes are connected, an anode of one voltage regulator diode is connected to the first end of the transistor Q5, and an anode of the other voltage regulator diode is connected to the control end of the transistor Q5. In this way, the two voltage regulator diodes can maintain the voltages of the first end and the control end of the transistor Q5 to be relatively stable, to improve working stability of the transistor Q5.

A parasitic diode in the transistor Q6 includes one protection diode. An anode of the protection diode is connected to the second end of the transistor Q6, and a cathode of the protection diode is connected to the first end of the transistor Q6. In this way, when a voltage difference between the first voltage end V1 and the fifth voltage end V5 is relatively large, and the transistor Q6 may be burned out, the voltage difference between the first voltage end V1 and the fifth voltage end V5 first causes a breakdown of the protection diode. The protection diode that breaks down is equivalent to a conducting wire, and may conduct a large current signal to the fifth voltage end V5, to prevent the transistor Q6 from being burned out.

Embodiment 3

In a process in which the drive module drives the light source module 102 to emit light, if luminance of the light emitted by the light source module 102 is relatively high, a human eye may be damaged, and safety of the human eye cannot be ensured. The luminance of the light emitted by the light source module 102 is related to a magnitude of a current in the light source module 102. Therefore, to ensure human eye safety, the light source circuit 10 may further include a sampling control module. The sampling control module is configured to: collect a magnitude of a current existing when the light source module 102 emits light, and control the light source module 102 to stop emitting light when the magnitude of the current existing when the light source module 102 emits light exceeds a current threshold.

In the following description, implementations of the light source circuit 10 are separately described by using three cases: a case that the sampling control module "detects a magnitude of a current existing when the light source module 102 works as only an optical proximity light source", a case that the sampling control module "detects a magnitude of a current existing when the light source module 102 works as only a TOF light source", and a case that the sampling control module "detects a magnitude of a current existing when the light source module 102 works as an optical proximity light source and detects a magnitude of a current existing when the light source module 102 works as a TOF light source", as examples.

Figure 13:
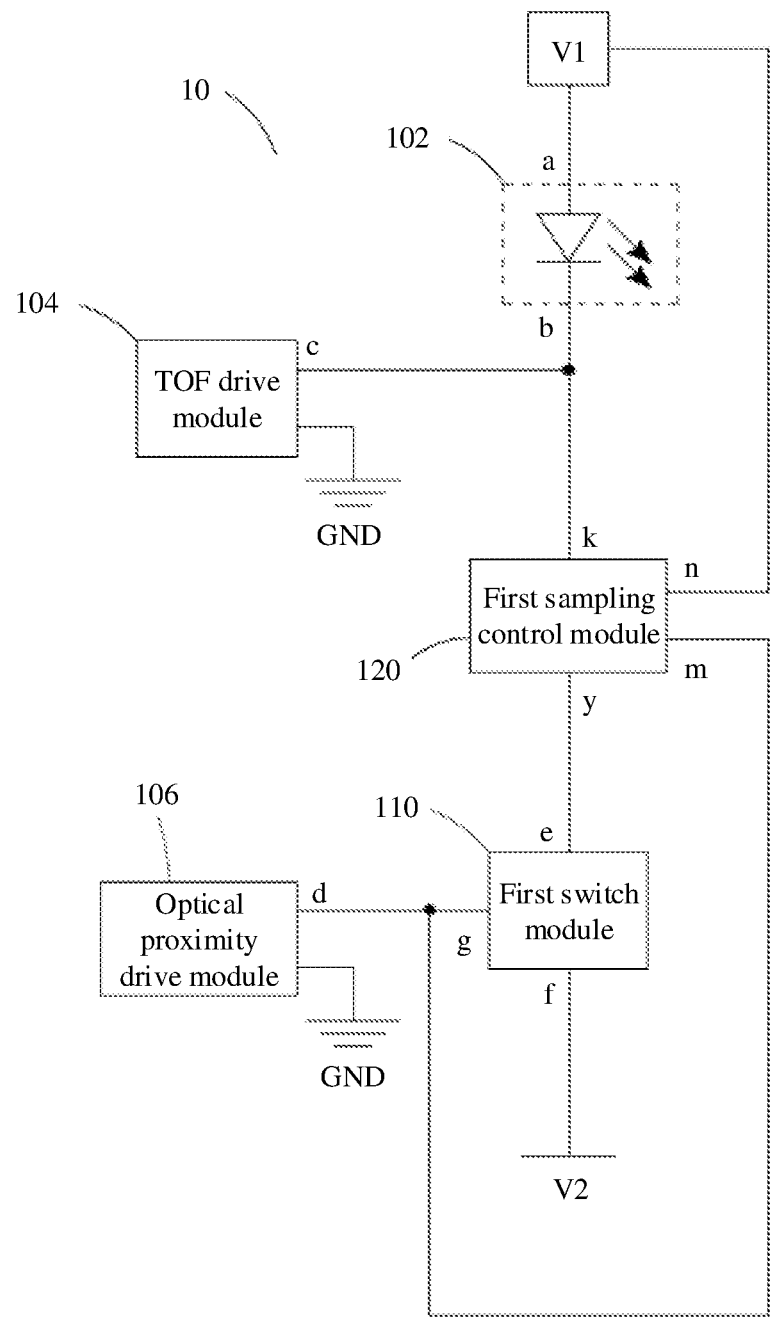
FIG. 13 is a schematic diagram of a structure of an eleventh light source circuit according to an embodiment of this application.

For the first case, details are as follows:

The sampling control module detects a magnitude of a current existing when the light source module 102 works as an optical proximity light source. The light source circuit 10 described in the first case in Embodiment 2 is used as an example. As shown in FIG. 13, the light source circuit 10 further includes a first sampling control module 120. When the first switch module 110 is turned on, the light source module 102 works as an optical proximity light source. The first sampling control module 120 may detect a value of a current in the light source module 102 when the first switch module 110 is turned on, and control light emission of the light source module 102 based on the current value.

In an example, a connection relationship of the first sampling control module 120 is shown in FIG. 13. The first sampling control module 120 has a first end k, a second end y, and a first output end m. The first end k of the first sampling control module 120 is connected to the second end b of the light source module 102, and the second end y of the first sampling control module 120 is connected to the first end e of the first switch module 110. In this way, when the first switch module 110 is turned on, a current flows out from the first voltage end V1, and flows into the second voltage end V2 through the light source module 102, the first sampling control module 120, and the first switch module 110. In this case, the first sampling control module 120 may detect a value of a current in the light source module 102 to obtain a first current value. The first output end m of the first sampling control module 120 may be connected to the control end g of the first switch module 110. A first current threshold may further be set in the first sampling control module 120. When the first current value exceeds the first current threshold, the first sampling control module 120 controls the first switch module 110 to be turned off, to avoid that light emitted by the light source module 102 is excessively strong and endangers human eye safety.

Figure 14:
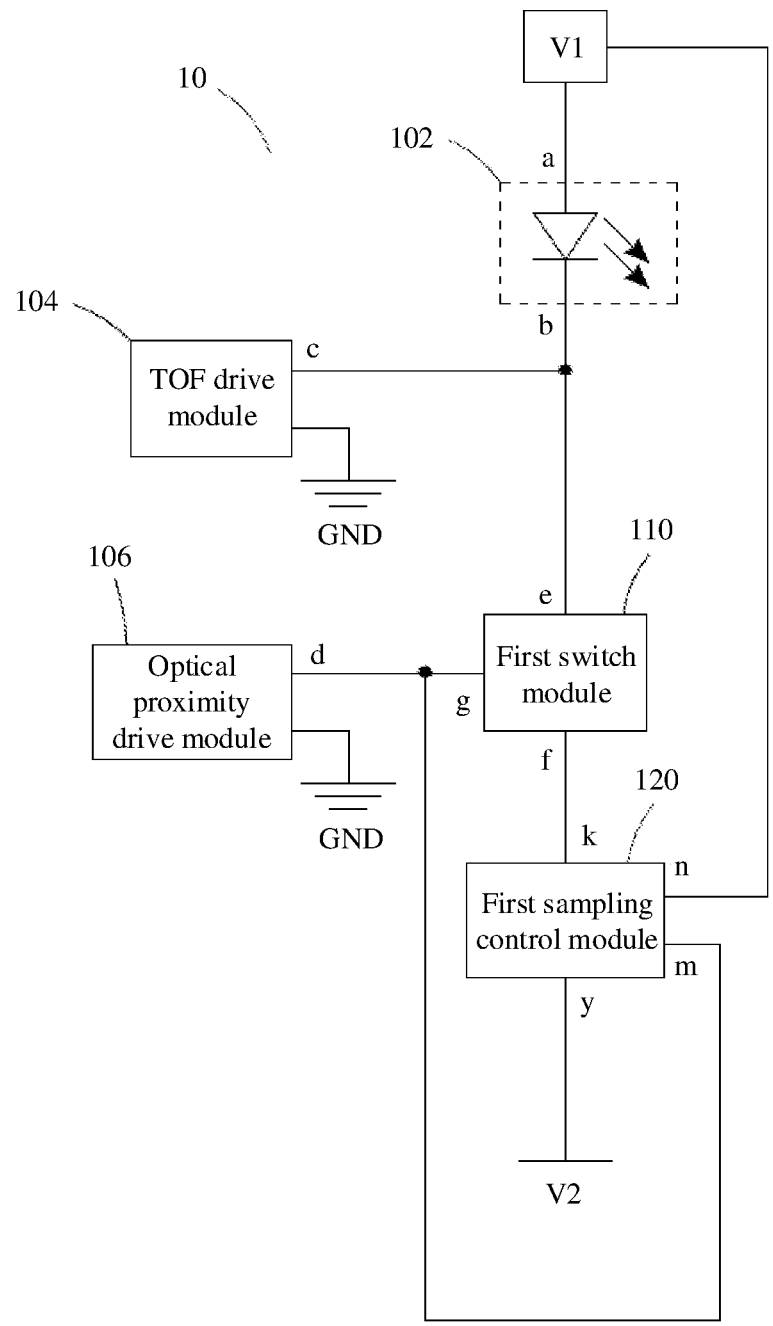
FIG. 14 is a schematic diagram of a structure of a twelfth light source circuit according to an embodiment of this application.

In another example, a connection relationship of the first sampling control module 120 is shown in FIG. 14. The first sampling control module 120 has a first end k, a second end y, and a first output end m. The first end k of the first sampling control module 120 is connected to the second end f of the first switch module 110, and the second end y of the first sampling control module 120 is connected to the second voltage end V2. In this way, when the first switch module 110 is turned on, a current flows out from the first voltage end V1, and flows into the second voltage end V2 through the light source module 102, the first switch module 110, and the first sampling control module 120. In this case, the first sampling control module 120 may detect a value of a current in the light source module 102 to obtain a first current value. The first output end m of the first sampling control module 120 may be connected to the control end g of the first switch module 110. A first current threshold may further be set in the first sampling control module 120. When the first current value exceeds the first current threshold, the first sampling control module 120 controls the first switch module 110 to be turned off, to avoid that light emitted by the light source module 102 is excessively strong and endangers human eye safety.

In the foregoing two examples, the first sampling control module 120 may further have a second output end n, and the second output end n of the first sampling control module 120 may be connected to the first voltage end V1. When the first current value exceeds the first current threshold, the first sampling control module 120 controls the first voltage end V1 to stop output, to avoid that light emitted by the light source module 102 is excessively strong and endangers human eye safety.

With reference to specific embodiments, the following describes a plurality of possible structures of the first sampling control module 120.

Figure 15:
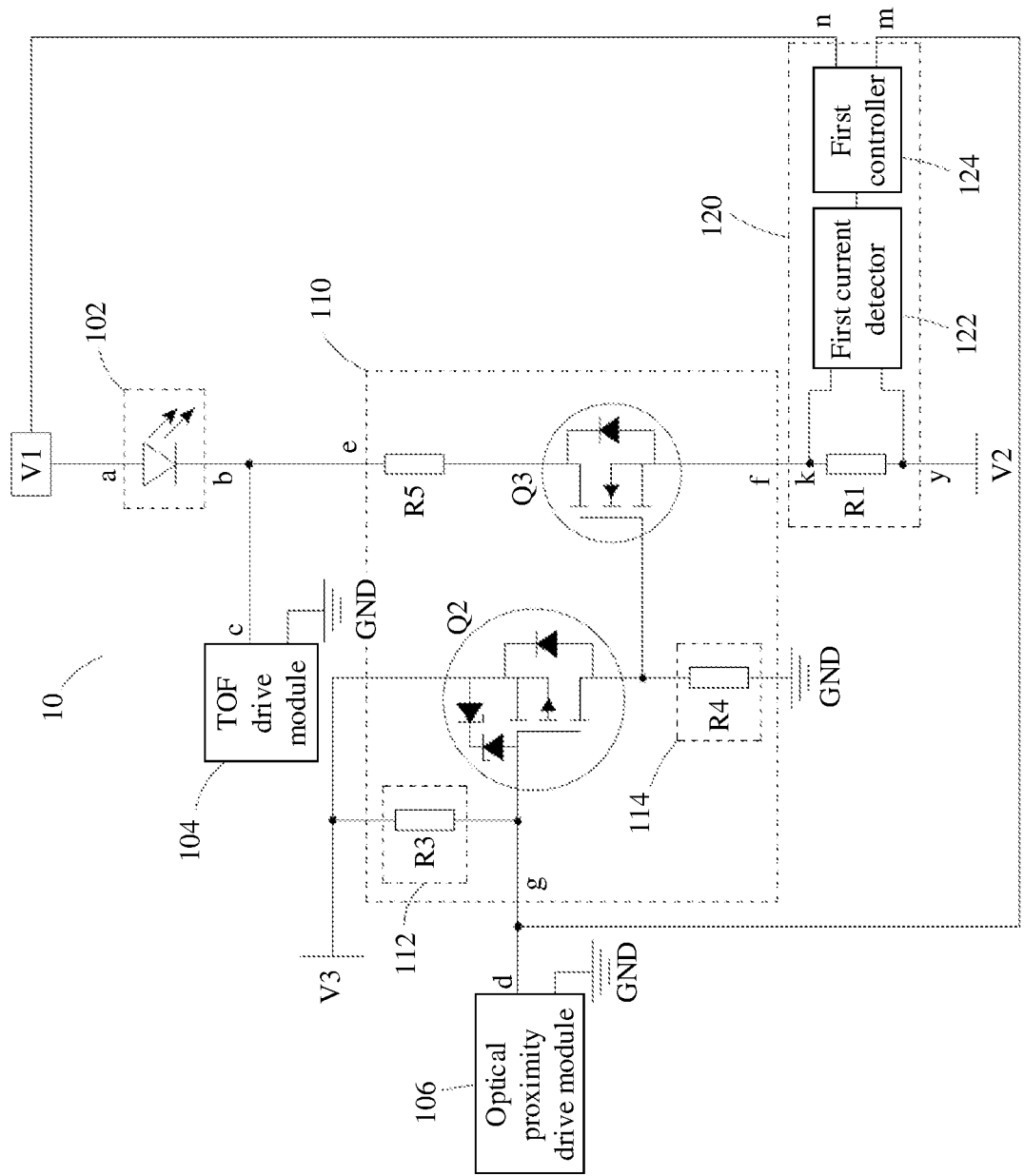
FIG. 15 is a schematic diagram of a structure of a thirteenth light source circuit according to an embodiment of this application.

In a first possible structure, as shown in FIG. 15, the first sampling control module 120 includes a resistor R1, a first current detector 122, and a first controller 124.

A connection relationship of the resistor R1 needs to be described with reference to the connection relationship of the first sampling control module 120. Specifically, when the first end k of the first sampling control module 120 is connected to the second end b of the light source module 102, and the second end y of the first sampling control module 120 is connected to the first end e of the first switch module 110, a first end of the resistor R1 is connected to the second end b of the light source module 102, and a second end of the resistor R1 is connected to the first end e of the first switch module 110. In other words, in this case, the resistor R1 is connected between the second end b of the light source module 102 and the first end e of the first switch module 110. When the first end k of the first sampling control module 120 is connected to the second end f of the first switch module 110, and the second end y of the first sampling control module 120 is connected to the second voltage end V2, a first end of the resistor R1 is connected to the second end f of the first switch module 110, and a second end of the resistor R1 is connected to the second voltage end V2. In other words, in this case, the resistor R1 is connected between the second end f of the first switch module 110 and the second voltage end V2. In the embodiment shown in FIG. 15, an implementation of the first sampling control module 120 is presented by using an example in which "the resistor R1 is connected between the second end f of the first switch module 110 and the second voltage end V2".

The first current detector 122 has an input end and an output end, and the first controller 124 has an input end and a first output end. The input end of the first current detector 122 is connected to the resistor R1 to detect a current value of the resistor R1 to obtain the first current value. The output end of the first current detector 122 is connected to the input end of the first controller 124, so that after the first current detector 122 obtains the first current value, the first current value can be input to the first controller 124. The first current threshold is set in the first controller 124. After the first current detector 122 inputs the first current value to the first controller 124, the first controller 124 may compare the first current value with the first current threshold. The first output end of the first controller 124 is connected to the control end of the first switch module 110. When the first current value exceeds the first current threshold, the first controller 124 controls the first switch module 110 to be turned off. In some embodiments, the first current detector 122 may be an ammeter or a multimeter, or another single-chip microcomputer that has a current detection function. The first controller 124 may be a single-chip microcomputer or the like that has a comparison control function.

The first controller 124 may also have a second output end, and the second output end of the first controller 124 may be connected to the first voltage end V1. When the first current value exceeds the first current threshold, the first controller 124 controls the first voltage end V1 to stop output.

In an example, the first current value may be an instantaneous current value, or may be an average current value. For example, when the optical proximity drive module 106 works, a low-level signal may be output at a frequency of 80 milliseconds/time, that is, the first switch module 110 is driven to be turned on at a frequency of 80 milliseconds/time. Duration in which the optical proximity drive module 106 outputs the low-level signal each time is 4 microseconds. In other words, duration in which the first switch module 110 is driven to be turned on each time is 4 microseconds. In this process, the first current detector 122 detects a value of a current in the light source module 102 at a fixed frequency, and the first current detector 122 may obtain a first current value in each time of detection, that is, the first current value is an instantaneous current value. The first controller 124 may compare each instantaneous first current value with the first current threshold, and when any instantaneous first current value exceeds the first current threshold, control the first switch module 110 to be turned off and control the first voltage end V1 to stop output.

In another example, the first current detector 122 detects a value of a current in the light source module 102 at a fixed frequency, and calculates an average current value of the light source module 102 in several times of detection based on several current values of the light source module 102 that are obtained through the several times of detection. The first current detector 122 inputs the average current value to the first controller 124 as a first current value. The first controller 124 may compare the first current value with the first current threshold, and when the first current value exceeds the first current threshold, control the first switch module 110 to be turned off and control the first voltage end V1 to stop output.

It may be understood that the foregoing two examples can be mutually combined. In other words, in some specific embodiments, the first current detector 122 may output an instantaneous current value to the first controller 124 and output an average current value to the first controller 124. When at least one of the instantaneous current value and the average current value exceeds the first current threshold, the first controller 124 controls the first switch module 110 to be turned off and controls the first voltage end V1 to stop output.

Figure 16:
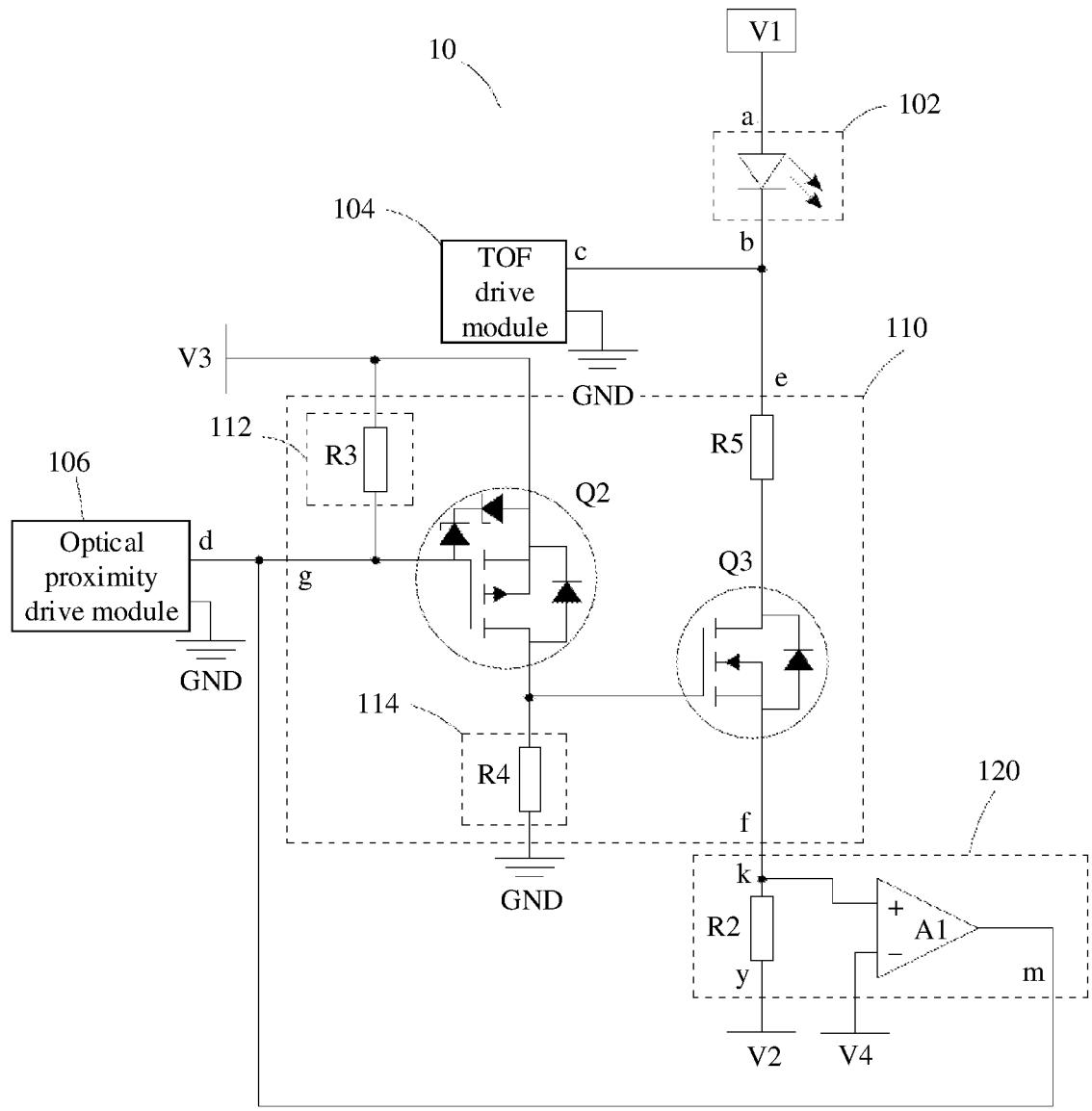
FIG. 16 is a schematic diagram of a structure of a fourteenth light source circuit according to an embodiment of this application.

In a second possible structure, as shown in FIG. 16, the first sampling control module 120 includes a resistor R2 and an operational amplifier A1.

A connection relationship of the resistor R2 needs to be described with reference to the connection relationship of the first sampling control module 120. Specifically, when the first end k of the first sampling control module 120 is connected to the second end b of the light source module 102, and the second end y of the first sampling control module 120 is connected to the first end e of the first switch module 110, a first end of the resistor R2 is connected to the second end b of the light source module 102, and a second end of the resistor R2 is connected to the first end e of the first switch module 110. In other words, in this case, the resistor R2 is connected between the second end b of the light source module 102 and the first end e of the first switch module 110. When the first end k of the first sampling control module 120 is connected to the second end f of the first switch module 110, and the second end y of the first sampling control module 120 is connected to the second voltage end V2, a first end of the resistor R2 is connected to the second end f of the first switch module 110, and a second end of the resistor R2 is connected to the second voltage end V2. In other words, in this case, the resistor R2 is connected between the second end f of the first switch module 110 and the second voltage end V2. In the embodiment shown in FIG. 16, an implementation of the first sampling control module 120 is presented by using an example in which "the resistor R2 is connected between the second end of the first switch module 110 and the second voltage end V2".

The operational amplifier A1 has an in-phase input end, an inverting input end, and an output end. The in-phase input end of the operational amplifier A1 is connected to the first end of the resistor R2. To be specific, when a current passes through the resistor R2, the in-phase input end of the operational amplifier A1 is connected to an end that is of the resistor R2 and that is used to input the current. The inverting input end of the operational amplifier A1 is connected to a fourth voltage end V4, and the output end of the operational amplifier A1 is connected to the control end of the first switch module 110. A voltage of the fourth voltage end V4 is a product of resistance of the resistor R2 and the first current threshold.

It is known from the foregoing description that the first sampling control module 120 controls the first switch module 110 to be turned off when the first current value is greater than the first current threshold. Therefore, it may also be described that the first current threshold is a maximum current value allowed in this embodiment of this application when the light source module 102 serves as an optical proximity light source, that is, a maximum current value of the resistor R2 that is allowed in this embodiment of this application. In this case, the product of the first current threshold and the resistance of the resistor R2 is a maximum voltage value of the resistor R2 that is allowed in this embodiment of this application. The fourth voltage end V4 outputs a voltage with the voltage value to the inverting input end of the operational amplifier A1. When an actual voltage of the resistor R2 is greater than the voltage of the fourth voltage end V4, a voltage of the in-phase input end of the operational amplifier A1 is greater than a voltage of the inverting input end of the operational amplifier A1, and the operational amplifier A1 outputs a high-level signal. In this case, the operational amplifier A1 may control the first switch module 110 to be turned off. In this way, the first sampling control module 120 can control the first switch module 110 to be turned off when the first current value exceeds the first current threshold. In addition, a power module in which the first voltage end V1 is located may be designed to stop output when receiving a high-level signal, so that the first sampling control module 120 can control the first voltage end V1 to stop output when the first current value exceeds the first current threshold.

The light source circuit 10 includes the first sampling control module 120, configured to detect a value of a current existing when the light source module 102 works as an optical proximity light source. When the value of the current existing when the light source module 102 works as an optical proximity light source exceeds the first current threshold, the first sampling control module 120 controls the first switch module 110 to be turned off, and controls the first voltage end V1 to stop output, to avoid that light emitted by the light source module 102 is excessively strong and endangers human eye safety. In this embodiment of this application, intensity of light emitted by the light source module 102 serving as an optical proximity light source when the first switch module 110 is turned on may be adjusted by adjusting resistance of the resistor R1 or the resistor R2.

Figure 17:
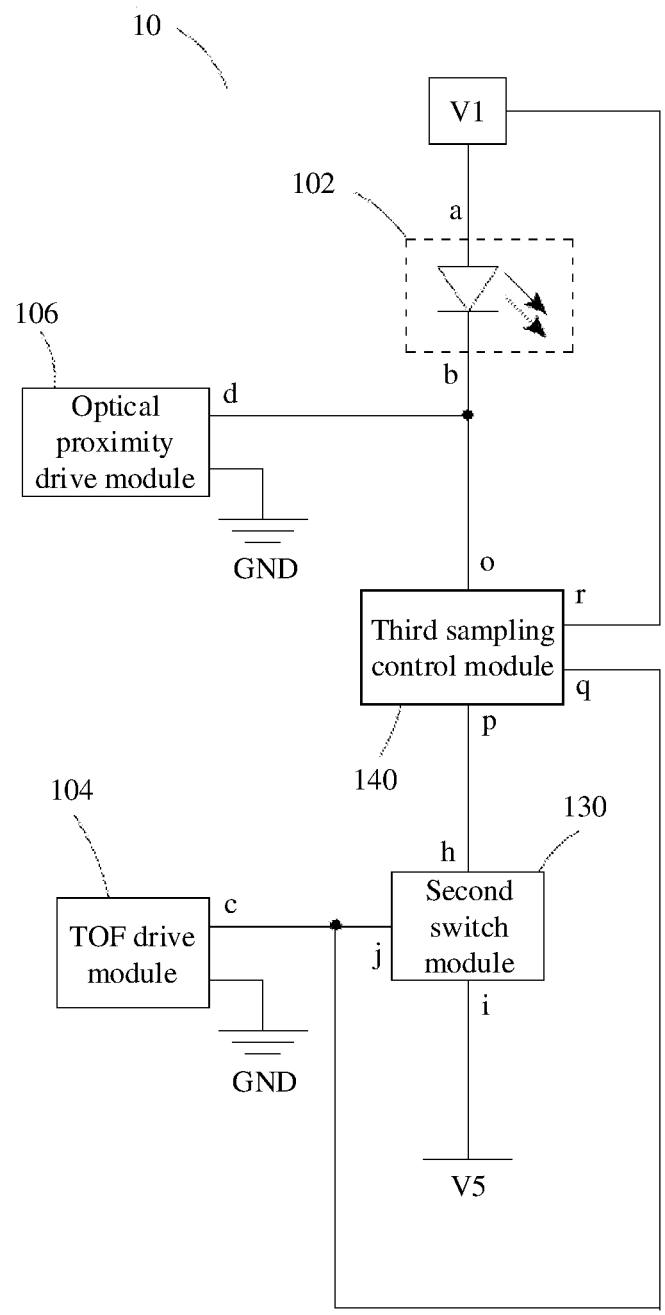
FIG. 17 is a schematic diagram of a structure of a fifteenth light source circuit according to an embodiment of this application.

For the second case, details are as follows:

The sampling control module detects a magnitude of a current existing when the light source module 102 works as a TOF light source. The light source circuit described in the second case in Embodiment 2 is used as an example. As shown in FIG. 17, the light source circuit 10 further includes a third sampling control module 140. When the second switch module 130 is turned on, the light source module 102 works as a TOF light source. The third sampling control module 140 may detect a value of a current in the light source module 102 when the second switch module 130 is turned on, and control light emission of the light source module 102 based on the current value.

In an example, a connection relationship of the third sampling control module 140 is shown in FIG. 17. The third sampling control module 140 has a first end o, a second end p, and a first output end q. The first end o of the third sampling control module 140 is connected to the second end b of the light source module 102, and the second end p of the third sampling control module 140 is connected to the first end h of the second switch module 130. In this way, when the second switch module 130 is turned on, a current flows out from the first voltage end V1, and flows into the fifth voltage end V5 through the light source module 102, the third sampling control module 140, and the second switch module 130. In this case, the third sampling control module 140 may detect a value of a current in the light source module 102 to obtain a fourth current value. The first output end q of the third sampling control module 140 may be connected to the control end j of the second switch module 130. A fourth current threshold may further be set in the third sampling control module 140. When the fourth current value exceeds the fourth current threshold, the third sampling control module 140 controls the second switch module 130 to be turned off, to avoid that light emitted by the light source module 102 is excessively strong and endangers human eye safety.

Figure 18:
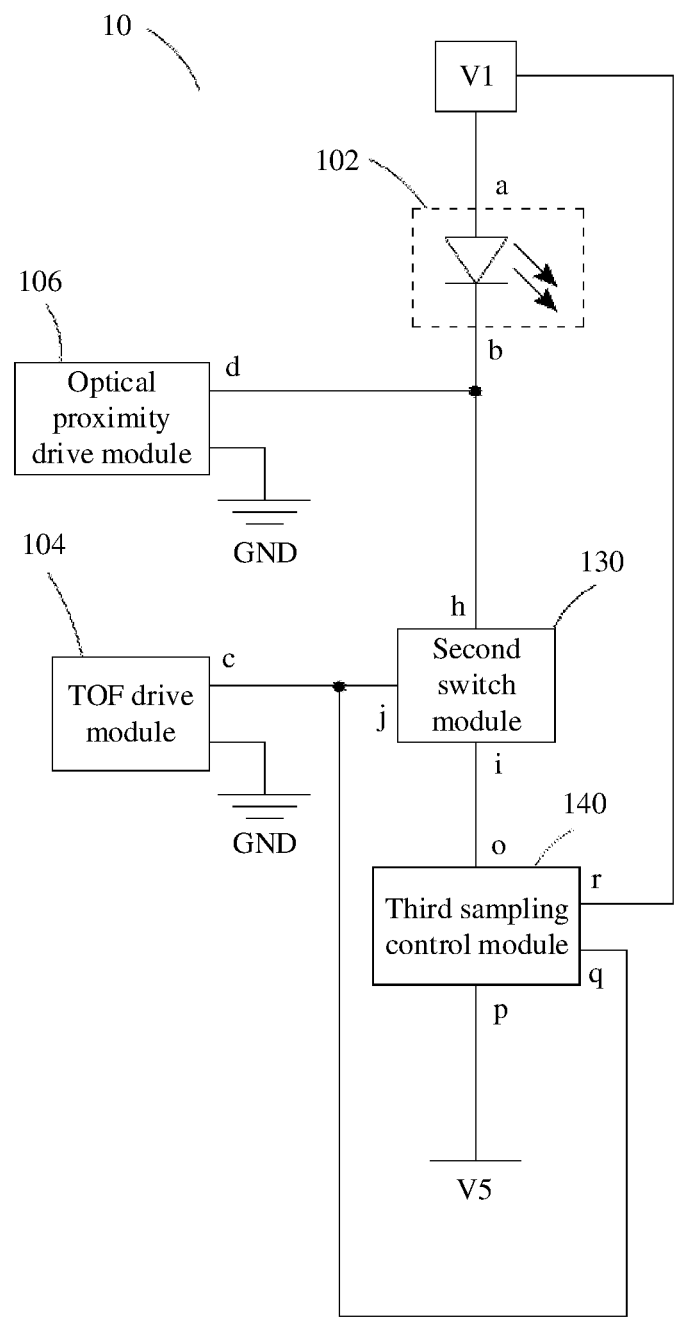
FIG. 18 is a schematic diagram of a structure of a sixteenth light source circuit according to an embodiment of this application.

In another example, a connection relationship of the third sampling control module 140 is shown in FIG. 18. The third sampling control module 140 has a first end o, a second end p, and a first output end q. The first end o of the third sampling control module 140 is connected to the second end i of the second switch module 130, and the second end p of the third sampling control module 140 is connected to the fifth voltage end V5. In this way, when the second switch module 130 is turned on, a current flows out from the first voltage end V1, and flows into the fifth voltage end V5 through the light source module 102, the second switch module 130, and the third sampling control module 140. In this case, the third sampling control module 140 may detect a value of a current in the light source module 102 to obtain a fourth current value. The first output end q of the third sampling control module 140 may be connected to the control end j of the second switch module 130. A fourth current threshold may further be set in the third sampling control module 140. When the fourth current value exceeds the fourth current threshold, the third sampling control module 140 controls the second switch module 130 to be turned off, to avoid that light emitted by the light source module 102 is excessively strong and endangers human eye safety.

In the foregoing two examples, the third sampling control module 140 may further have a second output end r, and the second output end r of the third sampling control module 140 may be connected to the first voltage end V1. When the fourth current value exceeds the fourth current threshold, the third sampling control module 140 controls the first voltage end V1 to stop output, to avoid that light emitted by the light source module 102 is excessively strong and endangers human eye safety.

With reference to specific embodiments, the following describes a plurality of possible structures of the third sampling control module 140.

Figure 19:
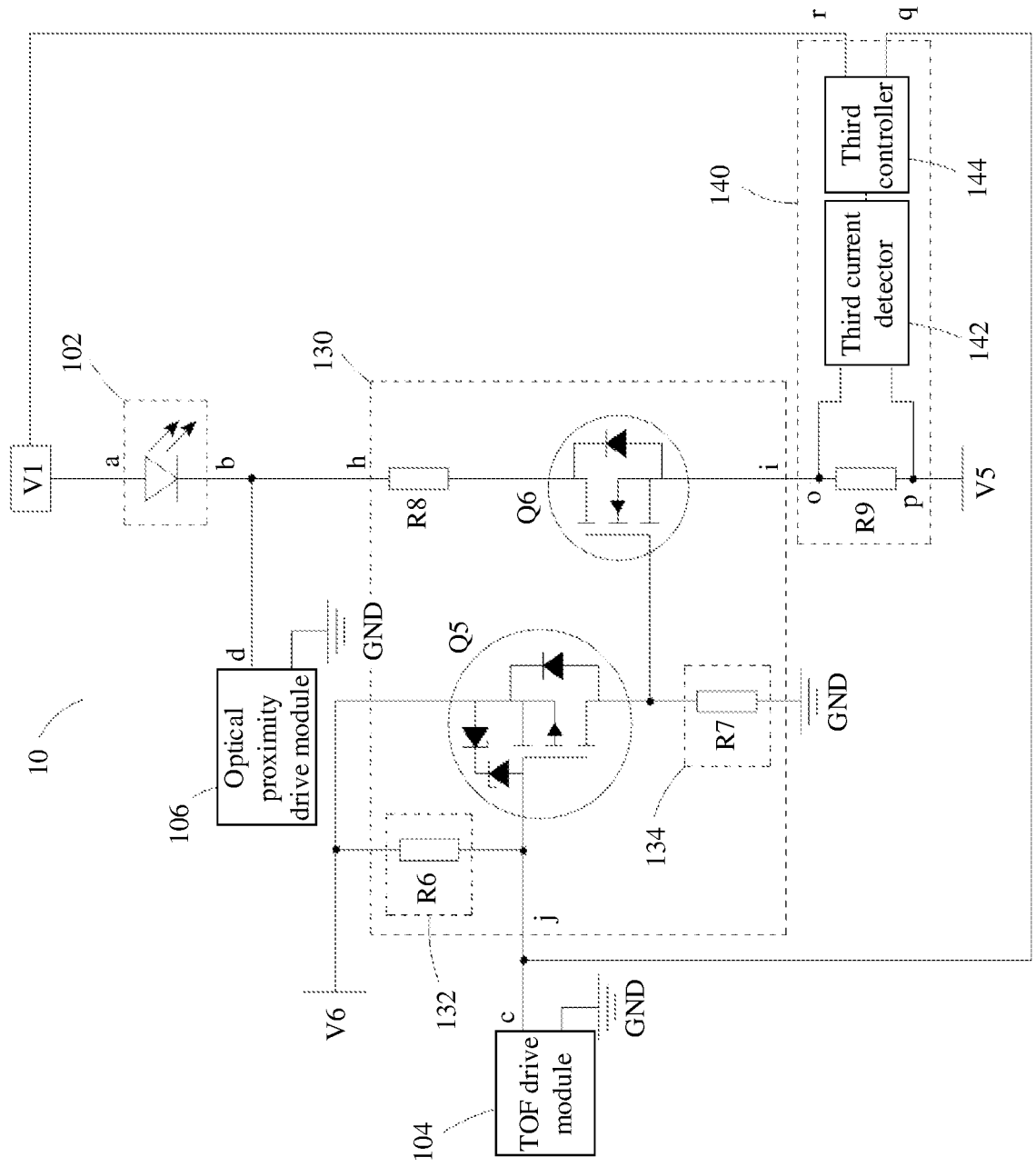
FIG. 19 is a schematic diagram of a structure of a seventeenth light source circuit according to an embodiment of this application.

In a first possible structure, as shown in FIG. 19, the third sampling control module 140 includes a resistor R9, a third current detector 142, and a third controller 144.

A connection relationship of the resistor R9 needs to be described with reference to the connection relationship of the third sampling control module 140. Specifically, when the first end o of the third sampling control module 140 is connected to the second end b of the light source module 102, and the second end p of the third sampling control module 140 is connected to the first end h of the second switch module 130, a first end of the resistor R9 is connected to the second end b of the light source module 102, and a second end of the resistor R9 is connected to the first end h of the second switch module 130. In other words, in this case, the resistor R9 is connected between the second end b of the light source module 102 and the first end h of the second switch module 130. When the first end o of the third sampling control module 140 is connected to the second end i of the second switch module 130, and the second end p of the third sampling control module 140 is connected to the fifth voltage end V5, a first end of the resistor R9 is connected to the second end i of the second switch module 130, and a second end of the resistor R9 is connected to the fifth voltage end V5. In other words, in this case, the resistor R9 is connected between the second end i of the second switch module 130 and the fifth voltage end V5. In the embodiment shown in FIG. 19, an implementation of the third sampling control module 140 is presented by using an example in which "the resistor R9 is connected between the second end i of the second switch module 130 and the fifth voltage end V5".

The third current detector 142 has an input end and an output end, and the third controller 144 has an input end and a first output end. The input end of the third current detector 142 is connected to the resistor R9 to detect a current value of the resistor R9 to obtain the fourth current value. The output end of the third current detector 142 is connected to the input end of the third controller 144, so that after the third current detector 142 obtains the fourth current value, the fourth current value can be input to the third controller 144. The fourth current threshold is set in the third controller 144. After the third current detector 142 inputs the fourth current value to the third controller 144, the third controller 144 may compare the fourth current value with the fourth current threshold. The first output end of the third controller 144 is connected to the control end of the second switch module 130. When the fourth current value exceeds the fourth current threshold, the third controller 144 controls the second switch module 130 to be turned off. In some embodiments, the third current detector 142 may be an ammeter or a multimeter, or another single-chip microcomputer that has a current detection function. The third controller 144 may be a single-chip microcomputer or the like that has a comparison control function.

The third controller 144 may also have a second output end, and the second output end of the third controller 144 may be connected to the first voltage end V1. When the fourth current value exceeds the fourth current threshold, the third controller 144 controls the first voltage end V1 to stop output.

In an example, the fourth current value may be an instantaneous current value, or may be an average current value. For example, during working, the TOF drive module 104 may continuously output a low-level signal to drive the second switch module 130 to be turned on. In this process, the third current detector 142 detects a value of a current in the light source module 102 at a fixed frequency, and the third current detector 142 may obtain a fourth current value in each time of detection, that is, the fourth current value is an instantaneous current value. The third controller 144 may compare each instantaneous fourth current value with the fourth current threshold, and when any instantaneous fourth current value exceeds the fourth current threshold, control the second switch module 130 to be turned off and control the first voltage end V1 to stop output.

In another example, the third current detector 142 detects a value of a current in the light source module 102 at a fixed frequency, and calculates an average current value of the light source module 102 in several times of detection based on several current values of the light source module 102 that are obtained through the several times of detection. The third current detector 142 inputs the average current value to the third controller 144 as a fourth current value. The third controller 144 may compare the fourth current value with the fourth current threshold, and when the fourth current value exceeds the fourth current threshold, control the second switch module 130 to be turned off and control the first voltage end V1 to stop output.

It may be understood that the foregoing two examples can be mutually combined. In other words, in some specific embodiments, the third current detector 142 may output an instantaneous current value to the third controller 144 and output an average current value to the third controller 144. When at least one of the instantaneous current value and the average current value exceeds the fourth current threshold, the third controller 144 controls the second switch module 130 to be turned off and controls the first voltage end V1 to stop output.

Figure 20:
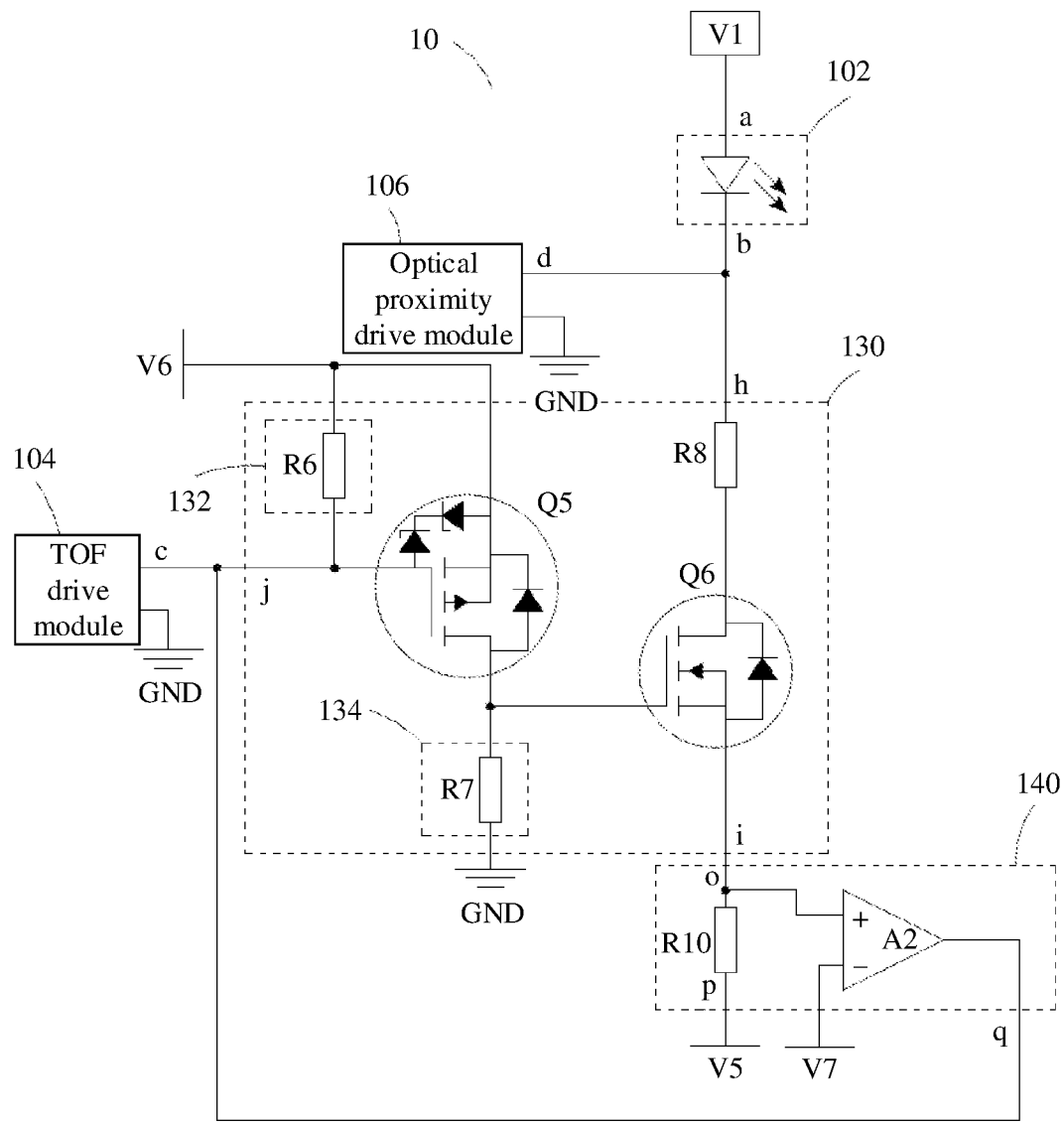
FIG. 20 is a schematic diagram of a structure of an eighteenth light source circuit according to an embodiment of this application.

In a second possible structure, as shown in FIG. 20, the third sampling control module 140 includes a resistor R10 and an operational amplifier A2.

A connection relationship of the resistor R10 needs to be described with reference to the connection relationship of the third sampling control module 140. Specifically, when the first end o of the third sampling control module 140 is connected to the second end b of the light source module 102, and the second end p of the third sampling control module 140 is connected to the first end h of the second switch module 130, a first end of the resistor R10 is connected to the second end b of the light source module 102, and a second end of the resistor R10 is connected to the first end h of the second switch module 130. In other words, in this case, the resistor R10 is connected between the second end b of the light source module 102 and the first end h of the second switch module 130. When the first end o of the third sampling control module 140 is connected to the second end i of the second switch module 130, and the second end p of the third sampling control module 140 is connected to the fifth voltage end V5, a first end of the resistor R10 is connected to the second end i of the second switch module 130, and a second end of the resistor R10 is connected to the fifth voltage end V5. In other words, in this case, the resistor R10 is connected between the second end i of the second switch module 130 and the fifth voltage end V5. In the embodiment shown in FIG. 20, an implementation of the third sampling control module 140 is presented by using an example in which "the resistor R10 is connected between the second end i of the second switch module 130 and the fifth voltage end V5".

The operational amplifier A2 has an in-phase input end, an inverting input end, and an output end. The in-phase input end of the operational amplifier A2 is connected to the first end of the resistor R10. To be specific, when a current passes through the resistor R10, the in-phase input end of the operational amplifier A2 is connected to an end that is of the resistor R10 and that is used to input the current. The inverting input end of the operational amplifier A2 is connected to a seventh voltage end V7, and the output end of the operational amplifier A2 is connected to the control end j of the second switch module 130. A voltage of the seventh voltage end V7 is a product of resistance of the resistor R10 and the fourth current threshold.

It is known from the foregoing description that the third sampling control module 140 controls the second switch module 130 to be turned off when the fourth current value is greater than the fourth current threshold. Therefore, it may also be described that the fourth current threshold is a maximum current value allowed in this embodiment of this application when the light source module 102 serves as a TOF light source, that is, a maximum current value of the resistor R10 that is allowed in this embodiment of this application. In this case, the product of the fourth current threshold and the resistance of the resistor R10 is a maximum voltage value of the resistor R10 that is allowed in this embodiment of this application. The seventh voltage end V7 outputs a voltage with the voltage value to the inverting input end of the operational amplifier A2. When an actual voltage of the resistor R10 is greater than the voltage of the seventh voltage end V7, a voltage of the in-phase input end of the operational amplifier A2 is greater than a voltage of the inverting input end of the operational amplifier A2, and the operational amplifier A2 outputs a high-level signal. In this case, the operational amplifier A2 may control the second switch module 130 to be turned off. In this way, the third sampling control module 140 can control the second switch module 130 to be turned off when the fourth current value exceeds the fourth current threshold. In addition, a power module in which the first voltage end V1 is located may be designed to stop output when receiving a high-level signal, so that the third sampling control module 140 can control the first voltage end V1 to stop output when the fourth current value exceeds the fourth current threshold.

The light source circuit 10 includes the third sampling control module 140, configured to detect a value of a current existing when the light source module 102 works as a TOF light source. When the value of the current existing when the light source module 102 works as a TOF light source exceeds the fourth current threshold, the third sampling control module 140 controls the second switch module 130 to be turned off, and controls the first voltage end V1 to stop output, to avoid that light emitted by the light source module 102 is excessively strong and endangers human eye safety.

In this embodiment of this application, intensity of light emitted by the light source module 102 serving as a TOF light source when the second switch module 130 is turned on may be adjusted by adjusting resistance of the resistor R9 or the resistor R10.

Figure 21:
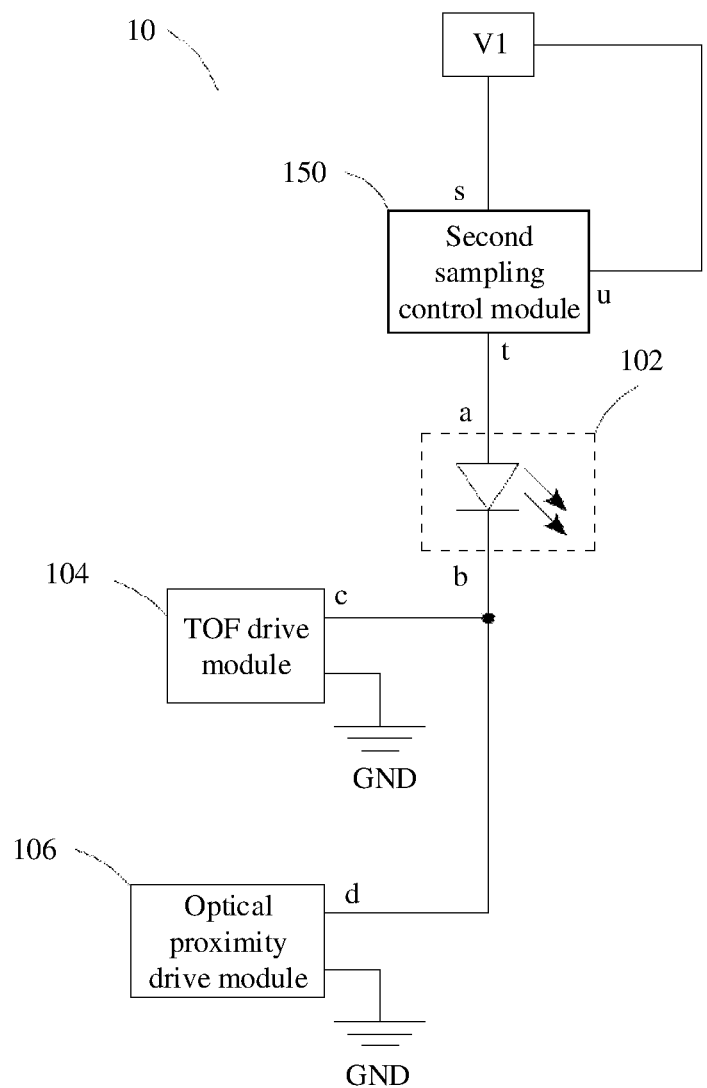
FIG. 21 is a schematic diagram of a structure of a nineteenth light source circuit according to an embodiment of this application.

For the third case, details are as follows:

The sampling control module detects a magnitude of a current existing when the light source module 102 works as an optical proximity light source and detects a magnitude of a current existing when the light source module 102 works as a TOF light source. The light source circuit 10 described in Embodiment 1 is used as an example. As shown in FIG. 21, the light source circuit 10 further includes a second sampling control module 150, and the second sampling control module 150 has a first end s, a second end t, and an output end u.

In an example, a connection relationship of the second sampling control module 150 is shown in FIG. 21. The first end s of the second sampling control module 150 is connected to the first voltage end V1, and the second end t of the second sampling control module 150 is connected to the first end a of the light source module 102. The output end u of the second sampling control module 150 may be connected to the first voltage end V1. In this way, when the TOF drive module 104 drives the light source module 102 to emit light, a current flows out from the first voltage end V1, and flows into the TOF drive module 104 through the second sampling control module 150 and the light source module 102. In this case, the second sampling control module 150 may detect a value of a current in the light source module 102 to obtain a second current value. A second current threshold may further be set in the second sampling control module 150. When the second current value exceeds the second current threshold, the second sampling control module 150 controls the first voltage end V1 to stop output. When the optical proximity drive module 106 drives the light source module 102 to emit light, a current flows out from the first voltage end V1, and flows into the optical proximity drive module 106 through the second sampling control module 150 and the light source module 102. In this case, the second sampling control module 150 may detect a value of a current in the light source module 102 to obtain a third current value. A third current threshold may further be set in the second sampling control module 150. When the third current value exceeds the third current threshold, the second sampling control module 150 controls the first voltage end V1 to stop output.

Figure 22:
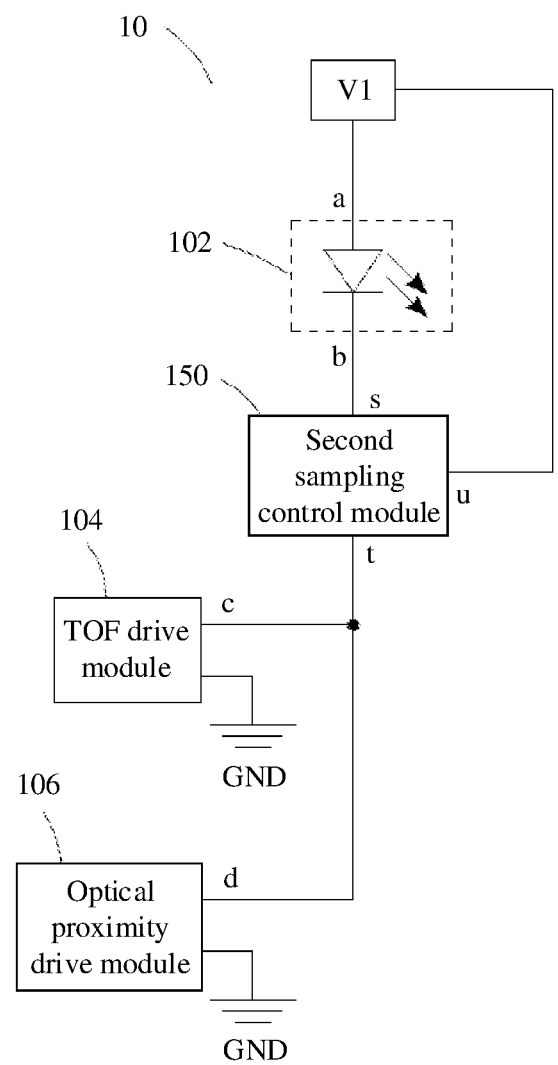
FIG. 22 is a schematic diagram of a structure of a twentieth light source circuit according to an embodiment of this application.

In another example, a connection relationship of the second sampling control module 150 is shown in FIG. 22. The first end s of the second sampling control module 150 is connected to the second end b of the light source module 102, and the second end t of the second sampling control module 150 is connected to the output end c of the TOF drive module 104 and the output end d of the optical proximity drive module 106. The output end u of the second sampling control module 150 may be connected to the first voltage end V1. In this way, when the TOF drive module 104 drives the light source module 102 to emit light, a current flows out from the first voltage end V1, and flows into the TOF drive module 104 through the light source module 102 and the second sampling control module 150. In this case, the second sampling control module 150 may detect a value of a current in the light source module 102 to obtain a second current value. A second current threshold may further be set in the second sampling control module 150. When the second current value exceeds the second current threshold, the second sampling control module 150 controls the first voltage end V1 to stop output. When the optical proximity drive module 106 drives the light source module 102 to emit light, a current flows out from the first voltage end V1, and flows into the optical proximity drive module 106 through the light source module 102 and the second sampling control module 150. In this case, the second sampling control module 150 may detect a value of a current in the light source module 102 to obtain a third current value. A third current threshold may further be set in the second sampling control module 150. When the third current value exceeds the third current threshold, the second sampling control module 150 controls the first voltage end V1 to stop output.

Similar to the plurality of possible structures of the first sampling control module 120 and the third sampling control module 140, the second sampling control module 150 may also have a plurality of possible structures.

Figure 23:
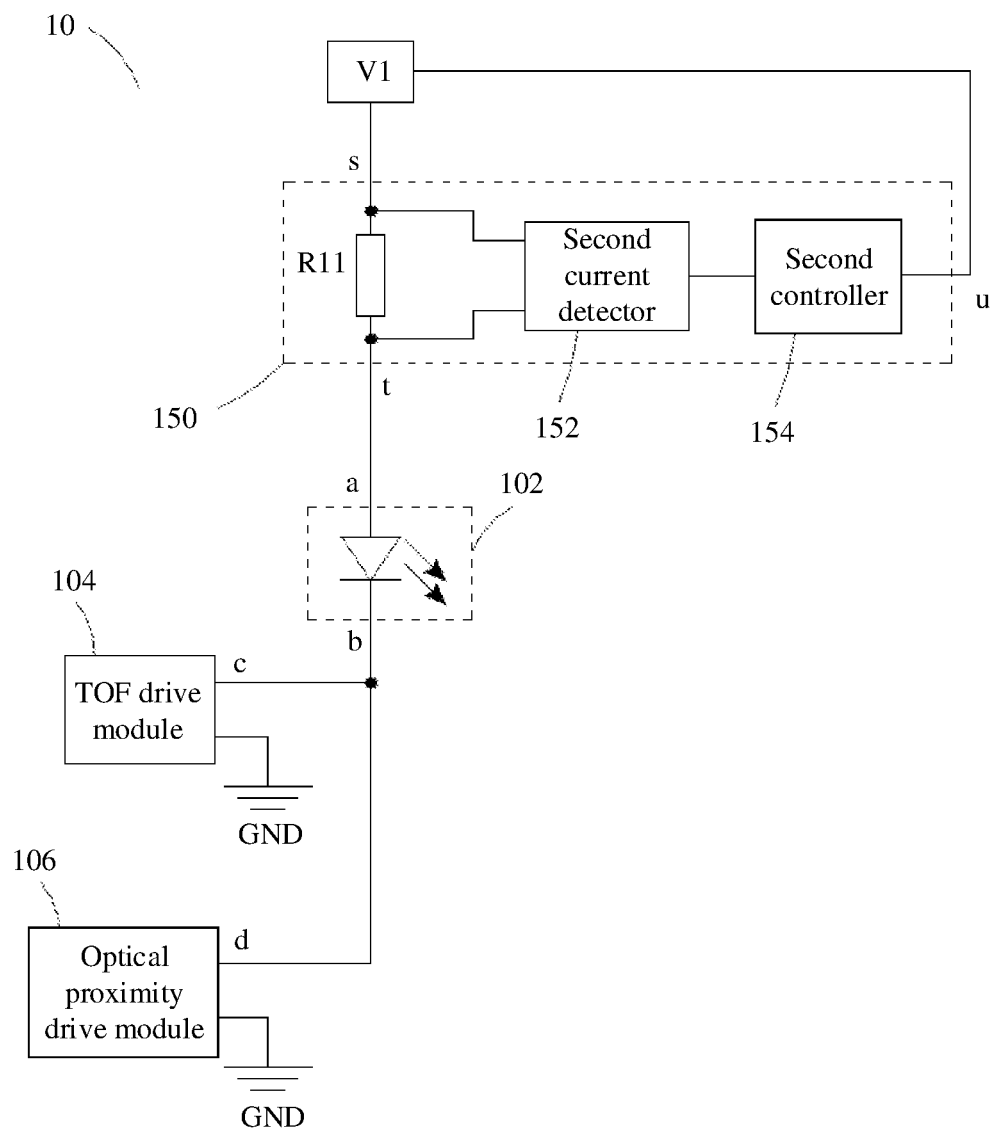
FIG. 23 is a schematic diagram of a structure of a twenty-first light source circuit according to an embodiment of this application.

In a first possible structure, as shown in FIG. 23, the second sampling control module 150 includes a resistor R11, a second current detector 152, and a second controller 154. A connection relationship among the resistor R11, the second current detector 152, and the second controller 154 is not described. When the light source circuit 10 works, the second current detector 152 may detect a current value of the resistor R11 and output the current value to the second controller 154. A second current threshold and a third current threshold may be set in the second controller 154. When the TOF drive module 104 drives the light source module 102 to emit light, the second controller 154 compares a current value (that is, a second current value) detected by the second current detector 152 with the second current threshold. When the second current value exceeds the second current threshold, the second controller 154 controls the first voltage end V1 to stop output. When the optical proximity drive module 106 drives the light source module 102 to emit light, the second controller 154 compares a current value (that is, a third current value) detected by the second current detector 152 with the third current threshold. When the third current value exceeds the third current threshold, the second controller 154 controls the first voltage end V1 to stop output.

It should be understood that the foregoing second current value and third current value are names of current values in the light source module 102 in different working states, and "second" and "third" are introduced to more clearly describe a process in which the second controller 154 compares current values in the light source module 102 in different working states with different current thresholds. This does not indicate that the second current value cannot be equal to the third current value. The foregoing description is also applicable to the first current value and the fourth current value.

Figure 24:
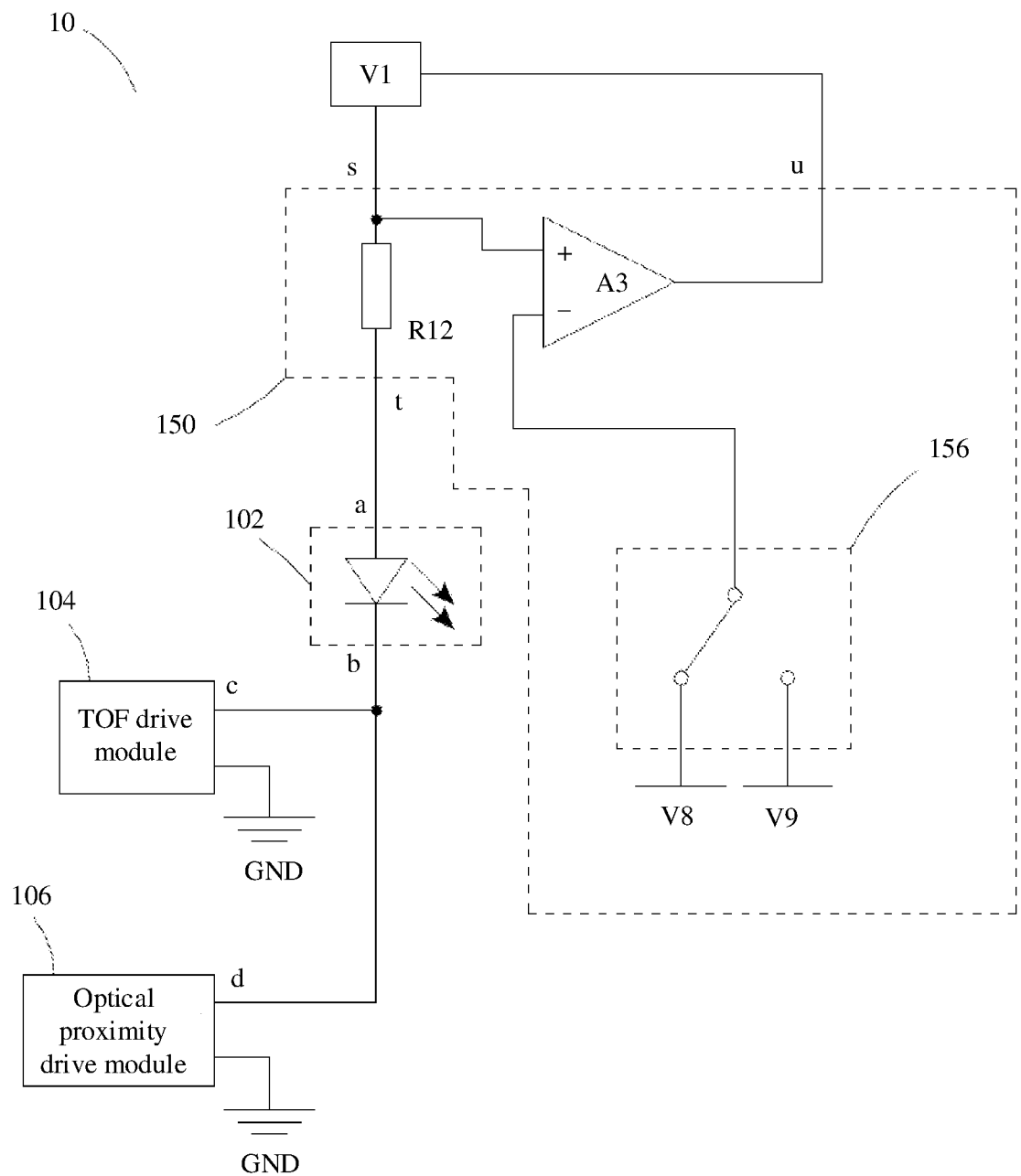
FIG. 24 is a schematic diagram of a structure of a twenty-second light source circuit according to an embodiment of this application.

In a second possible structure, as shown in FIG. 24, the second sampling control module 150 includes a resistor R12, an operational amplifier A3, and a switch component 156. A difference from the operational amplifier A1 and the operational amplifier A2 lies in that an inverting input end of the operational amplifier A3 needs to be connected to an eighth voltage end V8 and a ninth voltage end V9 through the switch component 156. The switch component 156 may be a single-pole double-throw switch. Through the single-pole double-throw switch, the inverting input end of the operational amplifier A3 may be connected to the fourth voltage end V4, or the inverting input end of the operational amplifier A3 may be connected to the seventh voltage end V7. A voltage of the eighth voltage end V8 is a product of the resistor R12 and the second current threshold, and a voltage of the ninth voltage end V9 is a product of the resistor R12 and the third current threshold. Another connection relationship between the resistor R12 and the operational amplifier A3 is not described. When the TOF drive module 104 drives the light source module 102 to emit light, the inverting input end of the operational amplifier A3 is connected to the eighth voltage end V8 through the switch component 156. When the optical proximity drive module 106 drives the light source module 102 to emit light, the inverting input end of the operational amplifier A3 is connected to the ninth voltage end V9 through the switch component 156. When an output end of the operational amplifier A3 outputs a high-level signal, the first voltage end V1 may be controlled to stop output.

The light source circuit 10 includes the second sampling control module 150, configured to detect a value of a current existing when the light source module 102 works. When a value of a current existing when the light source module 102 works as a TOF light source exceeds the second current threshold, the second sampling control module 150 controls the first voltage end V1 to stop output; and when a value of a current existing when the light source module 102 works as an optical proximity light source exceeds the third current threshold, the second sampling control module 150 controls the first voltage end V1 to stop output, to avoid that light emitted by the light source module 102 is excessively strong and endangers human eye safety. The second current threshold may be equal to the foregoing fourth current threshold, and the third current threshold may be equal to the foregoing first current threshold.

Figure 25:
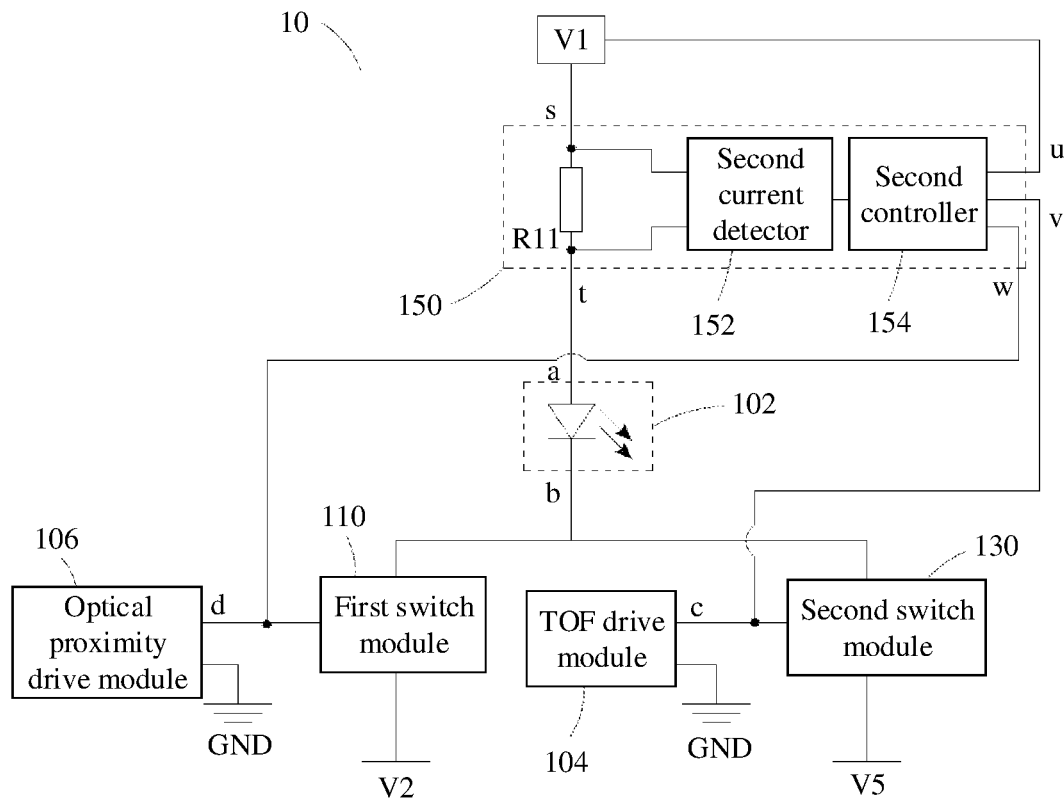
FIG. 25 is a schematic diagram of a structure of a twenty-third light source circuit according to an embodiment of this application.

It should be noted that the foregoing different embodiments may be mutually combined. For example, in an embodiment shown in FIG. 25, a light source circuit 10 that includes all of the second sampling control module, the light source module 102, the first switch module 110, the optical proximity drive module 106, the second switch module 130, and the TOF drive module 104 is shown. A light source circuit 10 formed by combining the foregoing different embodiments should be understood as being within the protection scope of this application.

The light source circuit 10 in this embodiment of this application includes the light source module 102, the TOF drive module 104, and the optical proximity drive module 106. At most one of the TOF drive module 104 and the optical proximity drive module 106 drives the light source module 102 to emit light. After the light source circuit 10 is used in a terminal, when the terminal needs to recognize an object, the TOF drive module 104 drives the light source module 102 to work; or when the terminal needs to perform proximity detection, the optical proximity drive module 106 drives the light source module 102 to work. In this way, the light source module 102 may serve as a TOF light source for implementing an object recognition function, and may serve as an optical proximity light source for implementing a proximity detection function, to reduce components used when the terminal implements the object recognition function and the proximity detection function, so as to help improve integration of the terminal.

The light source circuit 10 may further include the first sampling control module 120. The first sampling control module 120 may detect a value of a current existing when the light source module 102 works as an optical proximity light source, and control light emission of the light source module 102 based on the current value, to avoid that light emitted by the light source module 102 is excessively strong and endangers human eye safety. The light source circuit 10 may further include the third sampling control module 140. The third sampling control module 140 may detect a value of a current existing when the light source module 102 works as a TOF light source, and control light emission of the light source module 102 based on the current value, to avoid that light emitted by the light source module 102 is excessively strong and endangers human eye safety. The light source circuit 10 may further include the second sampling control module 150. The second sampling control module 150 may detect a value of a current existing when the light source module 102 works, and compare the current value with the second current threshold when the light source module 102 serves as a TOF light source to control light emission of the light source module 102, or compare the current value with the third current threshold when the light source module 102 serves as an optical proximity light source to control light emission of the light source module 102, to avoid that light emitted by the light source module 102 is excessively strong and endangers human eye safety.

An embodiment of this application further provides a terminal 20, including the light source circuit 10 in any one of the foregoing embodiments.

The light source circuit 10 includes a light source module 102, a time of flight TOF drive module 104, and an optical proximity drive module 106. A first end of the light source module 102 is connected to a first voltage end. An output end of the TOF drive module 104 is connected to a second end of the light source module 102, to drive the light source module 102 to emit light. An output end of the optical proximity drive module 106 is connected to the second end of the light source module 102, to drive the light source module 102 to emit light. At most one of the TOF drive module 104 and the optical proximity drive module 106 drives the light source module 102 to emit light.

In some embodiments, the light source circuit 10 further includes a first switch module 110. The output end of the optical proximity drive module 106 is connected to a control end of the first switch module 110, to control turn-on and turn-off of the first switch module 110. A first end of the first switch module 110 is connected to the second end of the light source module 102, a second end of the first switch module 110 is connected to a second voltage end, and a voltage of the second voltage end is less than a voltage of the first voltage end, so that the light source module 102 emits light when the first switch module 110 is turned on.

In some embodiments, the first switch module 110 includes a transistor Q1. A first end of the transistor Q1 is connected to the second end of the light source module 102, a second end of the transistor Q1 is connected to the second voltage end, and a control end of the transistor Q1 is connected to the output end of the optical proximity drive module 106.

In some embodiments, the first switch module 110 includes a transistor Q2 and a transistor Q3. A first end of the transistor Q2 is connected to a third voltage end, a second end of the transistor Q2 is connected to a control end of the transistor Q3, and a control end of the transistor Q2 is connected to the output end of the optical proximity drive module 106. A first end of the transistor Q3 is connected to the second end of the light source module 102, and a second end of the transistor Q3 is connected to the second voltage end.

In some embodiments, the first switch module 110 further includes a turn-off circuit and a current-limiting circuit. A first end of the turn-off circuit is connected to the first end of the transistor Q2, and a second end of the turn-off circuit is connected to the control end of the transistor Q2. A first end of the current-limiting circuit is connected to the second end of the transistor Q2, and a second end of the current-limiting circuit is connected to a ground cable GND.

In some embodiments, the light source circuit 10 further includes a first sampling control module 120. A first end of the first sampling control module 120 is connected to the second end of the light source module 102, and a second end of the first sampling control module 120 is connected to the first end of the first switch module 110. Alternatively, a first end of the first sampling control module 120 is connected to the second end of the first switch module 110, and a second end of the first sampling control module 120 is connected to the second voltage end. When the first switch module 110 is turned on, the first sampling control module 120 detects a value of a current in the light source module 102 to obtain a first current value. A first output end of the first sampling control module 120 is connected to the control end of the first switch module 110, and the first sampling control module 120 controls the first switch module 110 to be turned off when the first current value exceeds a first current threshold.

In some embodiments, the first sampling control module 120 includes a resistor R1, a current detector, and a controller. The resistor R1 is connected between the second end of the light source module 102 and the first end of the first switch module 110, or the resistor R1 is connected between the second end of the first switch module 110 and the second voltage end. An input end of the current detector is connected to the resistor R1 to detect a current value of the resistor R1 to obtain the first current value. An output end of the current detector is connected to an input end of the controller, to output the first current value to the controller. An output end of the controller is connected to the control end of the first switch module 110, and the controller controls the first switch module 110 to be turned off when the first current value exceeds the first current threshold.

In some embodiments, the first sampling control module 120 includes a resistor R2 and an operational amplifier A1. A first end of the resistor R2 is connected to the second end of the light source module 102, and a second end of the resistor R2 is connected to the first end of the first switch module 110. Alternatively, a first end of the resistor R2 is connected to the second end of the first switch module 110, and a second end of the resistor R2 is connected to the second voltage end. An in-phase input end of the operational amplifier A1 is connected to the first end of the resistor R2, an inverting input end of the operational amplifier A1 is connected to a fourth voltage end, an output end of the operational amplifier A1 is connected to the control end of the first switch module 110, and a voltage of the fourth voltage end is a product of resistance of the resistor R2 and the first current threshold.

In some embodiments, a second output end of the first sampling control module 120 is connected to the first voltage end, and the first sampling control module 120 controls the first voltage end to stop output when the first current value exceeds the first current threshold.

In some embodiments, the light source circuit 10 further includes a second switch module 130. The output end of the TOF drive module 104 is connected to a control end of the second switch module 130, to control turn-on and turn-off of the second switch module 130. A first end of the second switch module 130 is connected to the second end of the light source module 102, a second end of the second switch module 130 is connected to a fifth voltage end, and a voltage of the fifth voltage end is less than a voltage of the first voltage end, so that the light source module 102 emits light when the second switch module 130 is turned on.

In some embodiments, the light source circuit 10 further includes a second sampling control module 150. A first end of the second sampling control module 150 is connected to the first voltage end, and a second end of the second sampling control module 150 is connected to the first end of the light source module 102. An output end of the second sampling control module 150 is connected to the first voltage end. When the TOF drive module 104 drives the light source module 102 to emit light, the second sampling control module 150 detects a value of a current in the light source module 102 to obtain a second current value. When the second current value exceeds a second current threshold, the second sampling control module 150 controls the first voltage end to stop output. When the optical proximity drive module 106 drives the light source module 102 to emit light, the second sampling control module 150 detects a value of a current in the light source module 102 to obtain a third current value. When the third current value exceeds a third current threshold, the second sampling control module 150 controls the first voltage end to stop output.

In some embodiments, the output end of the TOF drive module 104 is configured to output a first preset voltage to the second end of the light source module 102, where the first preset voltage is less than the voltage of the first voltage end, to drive the light source module 102 to emit light. The output end of the optical proximity drive module 106 is configured to output a second preset voltage to the second end of the light source module 102, where the second preset voltage is less than the voltage of the first voltage end, to drive the light source module 102 to emit light.

Figure 26:
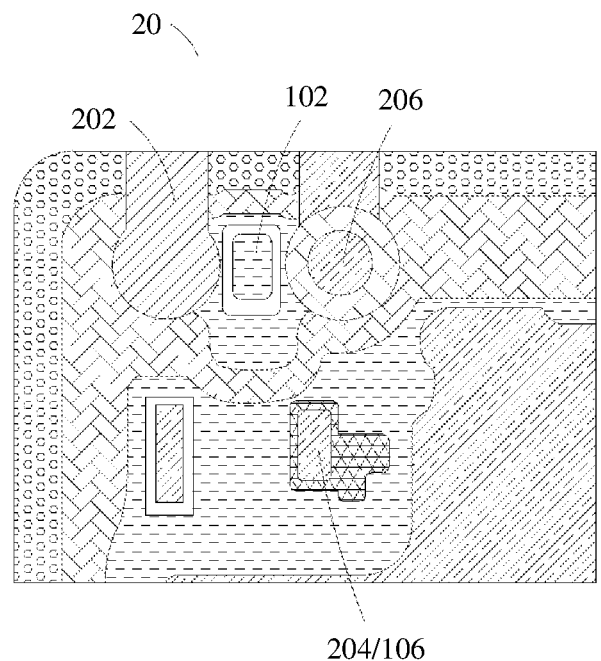
FIG. 26 is a schematic diagram of an inner structure of a terminal according to an embodiment of this application.

FIG. 26 is a schematic diagram of an inner structure of the terminal 20 according to an embodiment of this application. As shown in FIG. 26, the terminal 20 may further include a TOF receiving module 202, an optical proximity receiving module 204, a front-facing camera 206, a processor (not shown in the figure), and the like. The front-facing camera 206 is configured to perform front-facing photographing of the terminal 20.

The TOF receiving module 202 may be connected to the processor, so that when the TOF drive module 104 drives the light source module 102 to work, the TOF receiving module 202 may receive reflected light formed when emitted light is irradiated onto a to-be-recognized object. When the TOF receiving module 202 receives the reflected light, the processor may determine a time of flight of the light, to obtain depth information of the to-be-recognized object, so as to recognize the object.

The optical proximity receiving module 204 may be connected to the processor, so that when the optical proximity drive module 106 drives the light source module 102 to work, the optical proximity receiving module 204 may detect reflected light of emitted light. When the optical proximity receiving module 204 detects the reflected light, the processor may learn of object proximity, and respond accordingly, for example, control the terminal 20 to be screen-off.

The processor may further be connected to the TOF drive module 104 and the optical proximity drive module 106, to control the TOF drive module 104 and the optical proximity drive module 106 to work. In this case, a working process of the terminal 20 may include the following.

When the processor does not obtain an object recognition control instruction, the processor controls the optical proximity drive module 106 to work. In this case, the optical proximity drive module 106 drives the light source module 102 to emit light. When obtaining an object recognition control instruction, the processor controls the optical proximity drive module 106 to stop working, so that the output end of the optical proximity drive module 106 no longer outputs a voltage signal, and the processor controls the TOF drive module 104 to work. In this case, the TOF drive module 104 drives the light source module 102 to emit light. After object recognition is completed, the processor controls the TOF drive module 104 to stop working, so that the output end of the TOF drive module 104 no longer outputs a voltage signal, and the processor may control the optical proximity drive module 106 to work. The object recognition control instruction herein includes a facial unlocking control instruction and a facial payment control instruction. Usually, when obtaining a proximity detection control instruction, the processor may control the optical proximity drive module 106 to work again, to reduce energy consumption of the terminal 20.

In some embodiments, as shown in FIG. 26, the optical proximity drive module 106 and the optical proximity receiving module 204 may be integrated.

In some embodiments, the processor may further be connected to the second sampling control module 150, so that the processor may send a control instruction to the second sampling control module 150, to enable the second sampling control module 150 to work according to the control instruction. In this way, when the processor controls the optical proximity drive module 106 to work, and controls the TOF drive module 104 not to work, so that the optical proximity drive module 106 drives the light source module 102 to emit light, the processor sends a first control instruction to the second sampling control module 150, and the second sampling control module 150 may compare a detected current value of the light source module 102 with the third current threshold according to the first control instruction. When the processor controls the TOF drive module 104 to work, and controls the optical proximity drive module 106 not to work, so that the TOF drive module 104 drives the light source module 102 to emit light, the processor sends a second control instruction to the second sampling control module 150, and the second sampling control module 150 may compare a detected current value of the light source module 102 with the second current threshold according to the second control instruction.

Further, when the second sampling control module 150 includes a resistor R11, a second current detector 152, and a second controller 154, the processor may be connected to the second controller 154 in the second sampling control module 150, so that the second controller 154 may obtain the first control instruction or the second control instruction, and compare a current value that is output by the second current detector 152 with the third current threshold or the second current threshold according to the first control instruction or the second control instruction. When the second sampling control module 150 includes a resistor R12, an operational amplifier A3, and a switch component 156, the processor may be connected to the switch component 156 in the second sampling control module 150, so that when the processor sends the first control instruction, an inverting input end of the operational amplifier A3 is connected to a ninth voltage end V9 through the switch component 156; or when the processor sends the second control instruction, an inverting input end of the operational amplifier A3 is connected to an eighth voltage end V8 through the switch component 156.

The terminal 20 in this embodiment of this application includes the light source circuit 10 in any one of the foregoing embodiments. The light source circuit 10 includes the light source module 102, the TOF drive module 104, and the optical proximity drive module 106. At most one of the TOF drive module 104 and the optical proximity drive module 106 drives the light source module 102 to emit light. After the light source circuit 10 is used in the terminal 20, when the terminal 20 needs to recognize an object, the TOF drive module 104 drives the light source module 102 to work; or when the terminal needs to perform proximity detection, the optical proximity drive module 106 drives the light source module 102 to work. In this way, the light source module 102 may serve as a TOF light source for implementing an object recognition function, and may serve as an optical proximity light source for implementing a proximity detection function, to reduce components used when the terminal 20 implements the object recognition function and the proximity detection function, so as to help improve integration of the terminal 20.

The light source circuit 10 may further include the first sampling control module 120. The first sampling control module 120 may detect a value of a current existing when the light source module 102 works as an optical proximity light source, and control light emission of the light source module 102 based on the current value, to avoid that light emitted by the light source module 102 is excessively strong and endangers human eye safety. The light source circuit 10 may further include the third sampling control module 140. The third sampling control module 140 may detect a value of a current existing when the light source module 102 works as a TOF light source, and control light emission of the light source module 102 based on the current value, to avoid that light emitted by the light source module 102 is excessively strong and endangers human eye safety. The light source circuit 10 may further include the second sampling control module 150. The second sampling control module 150 may detect a value of a current existing when the light source module 102 works, and compare the current value with the second current threshold when the light source module 102 serves as a TOF light source to control light emission of the light source module 102, or compare the current value with the third current threshold when the light source module 102 serves as an optical proximity light source to control light emission of the light source module 102, to avoid that light emitted by the light source module 102 is excessively strong and endangers human eye safety.

The foregoing embodiments are merely used to describe the technical solutions of this application, but not limit the technical solutions of this application. Although this application is described in detail with reference to the foregoing embodiments, persons of ordinary skill in the art should understand that they may still modify the technical solutions described in the foregoing embodiments, or perform equivalent replacement on some technical features. However, these modifications or replacements do not make the essence of the corresponding technical solutions depart from the spirit and scope of the technical solutions in embodiments of this application, and shall fall within the protection scope of this application.

What is claimed is:

1. A light source circuit, comprising a light source, a time of flight (TOF) drive circuit, and an optical proximity drive circuit, wherein:
   a first end of the light source is connected to a first voltage;
   an output end of the TOF drive circuit is connected to a second end of the light source circuit;
   an output end of the optical proximity drive circuit is connected to the second end of the light source; and
   at most one of the TOF drive circuit or the optical proximity drive circuit drives the light source to emit light at a time.

2. The light source circuit according to claim 1, further comprising a first switch;
wherein the output end of the optical proximity drive circuit is connected to a control end of the first switch, and controls a turn-on and a turn-off of the first switch; and
wherein a first end of the first switch is connected to the second end of the light source, a second end of the first switch is connected to a second voltage, and a voltage of the second voltage is less than a voltage of the first voltage, and the light source emits light when the first switch is turned on.

3. The light source circuit according to claim 2, wherein the first switch comprises a transistor Q1; and
a first end of the transistor Q1 is connected to the second end of the light source, a second end of the transistor Q1 is connected to the second voltage, and a control end of the transistor Q1 is connected to the output end of the optical proximity drive circuit.

4. The light source circuit according to claim 2, wherein the first switch comprises a transistor Q2 and a transistor Q3;
a first end of the transistor Q2 is connected to a third voltage, a second end of the transistor Q2 is connected to a control end of the transistor Q3, and a control end of the transistor Q2 is connected to the output end of the optical proximity drive circuit; and
a first end of the transistor Q3 is connected to the second end of the light source, and a second end of the transistor Q3 is connected to the second voltage.

5. The light source circuit according to claim 4, wherein the first switch further comprises a turn-off circuit and a current-limiting circuit;
a first end of the turn-off circuit is connected to the first end of the transistor Q2, and a second end of the turn-off circuit is connected to the control end of the transistor Q2; and
a first end of the current-limiting circuit is connected to the second end of the transistor Q2, and a second end of the current-limiting circuit is connected to a ground cable.

6. The light source circuit according to claim 2, wherein the light source circuit further comprises a first sampling control circuit;
a first end of the first sampling control circuit is connected to the second end of the light source, and a second end of the first sampling control circuit is connected to the first end of the first switch; or a first end of the first sampling control circuit is connected to the second end of the first switch, and a second end of the first sampling control circuit is connected to the second voltage; and
when the first switch is turned on, the first sampling control circuit detects a current value of the light source to obtain a first current value; and a first output end of the first sampling control circuit is connected to the control end of the first switch, and the first sampling control circuit controls the first switch to be turned off when the first current value exceeds a first current threshold.

7. The light source circuit according to claim 6, wherein the first sampling control circuit comprises a resistor R1, a current detector, and a controller;
wherein the resistor R1 is connected between the second end of the light source and the first end of the first switch, or the resistor R1 is connected between the second end of the first switch and the second voltage; and
an input end of the current detector is connected to the resistor R1 and detects a current value of the resistor R1 to obtain the first current value, an output end of the current detector is connected to an input end of the controller and outputs the first current value to the controller, an output end of the controller is connected to the control end of the first switch, and the controller controls the first switch to be turned off when the first current value exceeds the first current threshold.

8. The light source circuit according to claim 6, wherein the first sampling control comprises a resistor R2 and an operational amplifier A1;
a first end of the resistor R2 is connected to the second end of the light source, and a second end of the resistor R2 is connected to the first end of the first switch; or a first end of the resistor R2 is connected to the second end of the first switch, and a second end of the resistor R2 is connected to the second voltage; and
an in-phase input end of the operational amplifier A1 is connected to the first end of the resistor R2, an inverting input end of the operational amplifier A1 is connected to a fourth voltage, an output end of the operational amplifier A1 is connected to the control end of the first switch, and a voltage of the fourth voltage is a product of resistance of the resistor R2 and the first current threshold.

9. The light source circuit according to claim 8, wherein a second output end of the first sampling control circuit is connected to the first voltage, and when the first current value exceeds the first current threshold, the first sampling control circuit controls the first voltage to stop output.

10. The light source circuit according to claim 1, wherein the light source circuit further comprises a second switch;
wherein the output end of the TOF drive circuit is connected to a control end of the second switch, and controls a turn-on and a turn-off of the second switch; and
a first end of the second switch is connected to the second end of the light source circuit, a second end of the second switch is connected to a fifth voltage, and a voltage of the fifth voltage is less than the voltage of the first voltage, and the light source emits light when the second switch is turned on.

11. The light source circuit according to claim 1, wherein the light source circuit further comprises a second sampling control circuit;
a first end of the second sampling control circuit is connected to the first voltage, a second end of the second sampling control circuit is connected to the first end of the light source, and an output end of the second sampling control circuit is connected to the first voltage;
when the TOF drive circuit drives the light source to emit light, the second sampling control circuit detects a current value of the light source to obtain a second current value, and when the second current value exceeds a second current threshold, the second sampling control circuit controls the first voltage end to stop output; and
when the optical proximity drive circuit drives the light source circuit to emit light, the second sampling control circuit detects a current value of the light source to obtain a third current value, and when the third current value exceeds a third current threshold, the second sampling control circuit controls the first voltage end to stop output.

12. The light source circuit according to claim 1, wherein the output end of the TOF drive circuit is configured to output a first preset voltage to the second end of the light source, and the first preset voltage is less than a voltage of the first voltage, and drives the light source to emit light; and
wherein the output end of the optical proximity drive circuit is configured to output a second preset voltage to the second end of the light source, and the second preset voltage is less than the voltage of the first voltage and drives the light source to emit light.

13. A terminal, comprising a light source circuit, the light source circuit comprising:
a light source, a time of flight (TOF) drive circuit, and an optical proximity drive circuit, wherein:
a first end of the light source is connected to a first voltage;
an output end of the TOF drive circuit is connected to a second end of the light source circuit;
an output end of the optical proximity drive circuit is connected to the second end of the light source; and
at most one of the TOF drive circuit or the optical proximity drive circuit drives the light source to emit light at a time.

14. The terminal according to claim 13, wherein the light source circuit further comprises a first switch;
wherein the output end of the optical proximity drive circuit is connected to a control end of the first switch, and controls a turn-on and a turn-off of the first switch; and
wherein a first end of the first switch is connected to the second end of the light source, a second end of the first switch is connected to a second voltage, and a voltage of the second voltage is less than a voltage of the first voltage, and the light source emits light when the first switch is turned on.

15. The terminal according to claim 14, wherein the first switch comprises a transistor Q1; and
a first end of the transistor Q1 is connected to the second end of the light source, a second end of the transistor Q1 is connected to the second voltage, and a control end of the transistor Q1 is connected to the output end of the optical proximity drive circuit.

16. The terminal according to claim 14, wherein the first switch comprises a transistor Q2 and a transistor Q3;
a first end of the transistor Q2 is connected to a third voltage, a second end of the transistor Q2 is connected to a control end of the transistor Q3, and a control end of the transistor Q2 is connected to the output end of the optical proximity drive circuit; and
a first end of the transistor Q3 is connected to the second end of the light source, and a second end of the transistor Q3 is connected to the second voltage.

17. The terminal according to claim 16, wherein the first switch further comprises a turn-off circuit and a current-limiting circuit;
a first end of the turn-off circuit is connected to the first end of the transistor Q2, and a second end of the turn-off circuit is connected to the control end of the transistor Q2; and a first end of the current-limiting circuit is connected to the second end of the transistor Q2, and a second end of the current-limiting circuit is connected to a ground cable.

18. The terminal according to claim 14, wherein the light source circuit further comprises a first sampling control circuit;
a first end of the first sampling control circuit is connected to the second end of the light source, and a second end of the first sampling control circuit is connected to the first end of the first switch; or a first end of the first sampling control circuit is connected to the second end of the first switch, and a second end of the first sampling control circuit is connected to the second voltage; and
when the first switch is turned on, the first sampling control circuit detects a current value of the light source to obtain a first current value; and a first output end of the first sampling control circuit is connected to the control end of the first switch, and the first sampling control circuit controls the first switch to be turned off when the first current value exceeds a first current threshold.

19. The terminal according to claim 18, wherein the first sampling control circuit comprises a resistor R1, a current detector, and a controller;
wherein the resistor R1 is connected between the second end of the light source and the first end of the first switch, or the resistor R1 is connected between the second end of the first switch and the second voltage; and
an input end of the current detector is connected to the resistor R1 and detects a current value of the resistor R1 to obtain the first current value, an output end of the current detector is connected to an input end of the controller and outputs the first current value to the controller, an output end of the controller is connected to the control end of the first switch, and the controller controls the first switch to be turned off when the first current value exceeds the first current threshold.

20. The terminal according to claim 18, wherein the first sampling control comprises a resistor R2 and an operational amplifier A1;
a first end of the resistor R2 is connected to the second end of the light source, and a second end of the resistor R2 is connected to the first end of the first switch; or a first end of the resistor R2 is connected to the second end of the first switch, and a second end of the resistor R2 is connected to the second voltage; and
an in-phase input end of the operational amplifier A1 is connected to the first end of the resistor R2, an inverting input end of the operational amplifier A1 is connected to a fourth voltage, an output end of the operational amplifier A1 is connected to the control end of the first switch, and a voltage of the fourth voltage is a product of resistance of the resistor R2 and the first current threshold.

* * * * *